July 7, 1970 A. F. KIRSCH 3,519,106

PULSE-SUPERVISED TRANSPORTATION SYSTEMS

Filed Dec. 30, 1966 13 Sheets-Sheet 1

WITNESSES:
Bernard R. Giegue
James F. Young

INVENTOR
Andrew F. Kirsch
BY C. L. Freedman
ATTORNEY

PULSE-SUPERVISED TRANSPORTATION SYSTEMS

Filed Dec. 30, 1966 13 Sheets-Sheet 3

PULSE-SUPERVISED TRANSPORTATION SYSTEMS

Filed Dec. 30, 1966 13 Sheets-Sheet 3

PULSE-SUPERVISED TRANSPORTATION SYSTEMS
Filed Dec. 30, 1966 
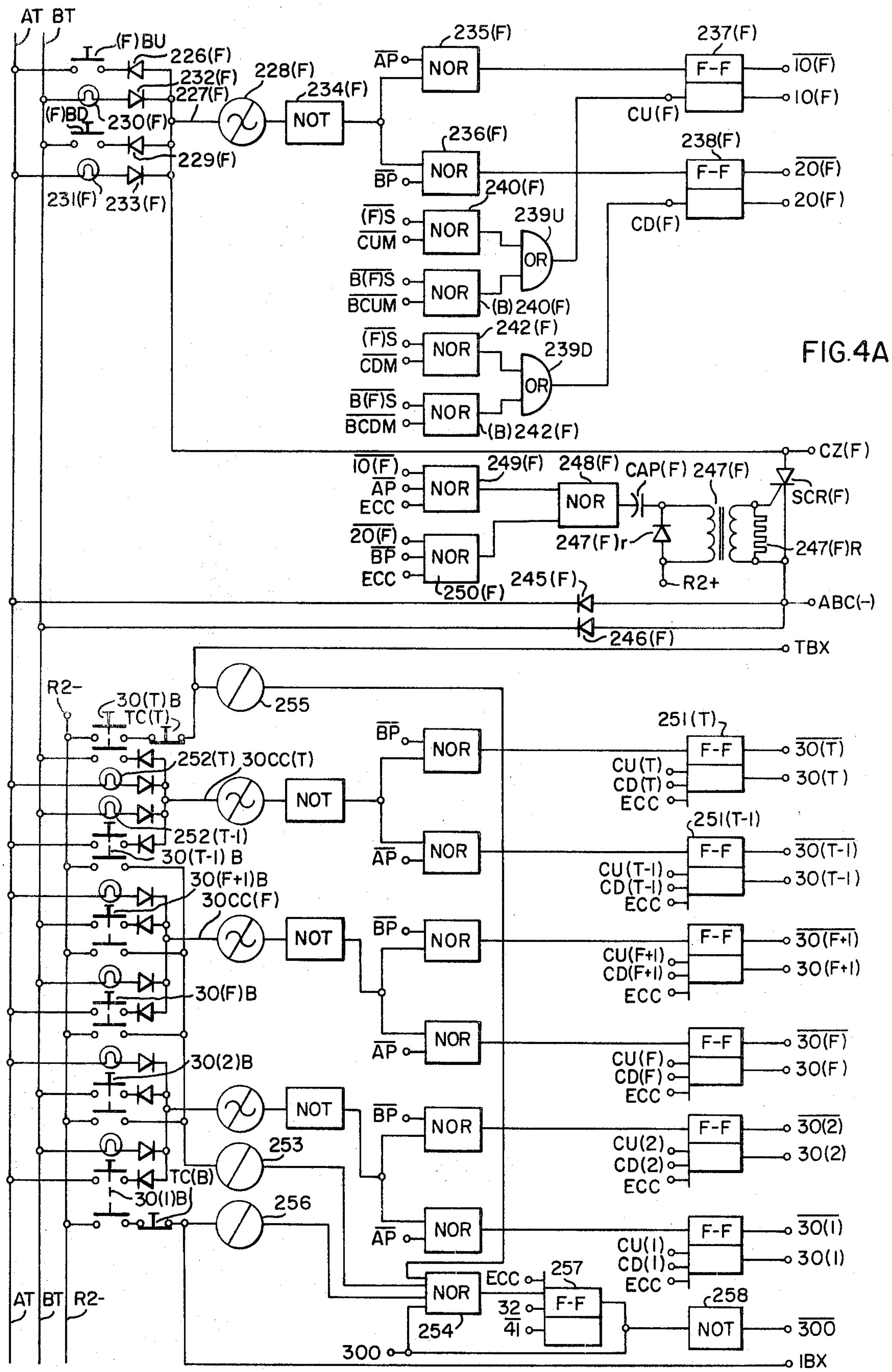

PULSE-SUPERVISED TRANSPORTATION SYSTEMS

Filed Dec. 30, 1966

PULSE-SUPERVISED TRANSPORTATION SYSTEMS

Filed Dec. 30, 1966 13 Sheets-Sheet 8

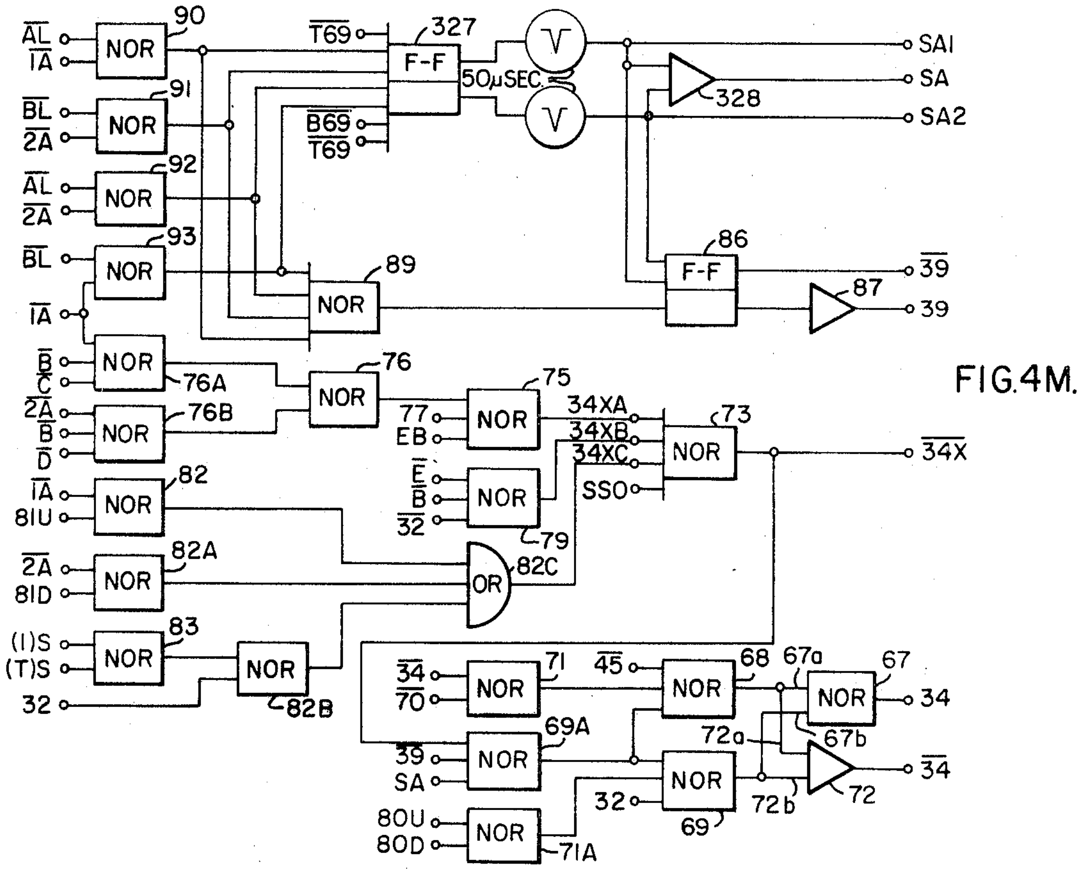
FIG. 4M.
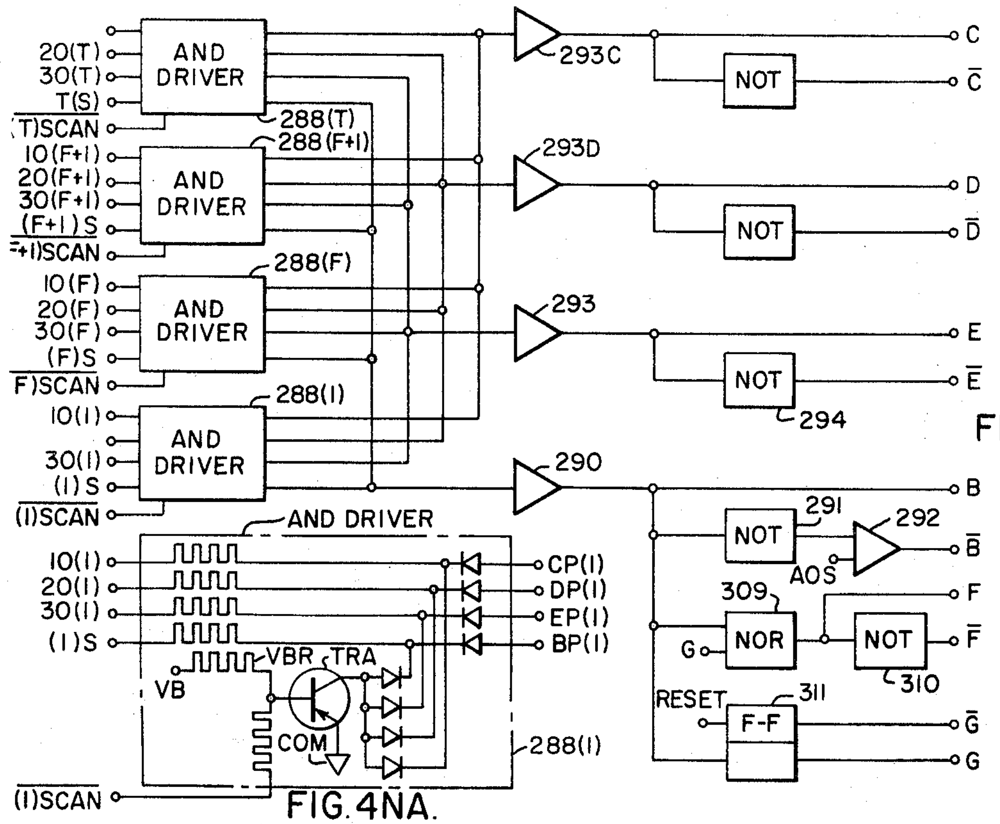
FIG. 4N.
FIG. 4NA.

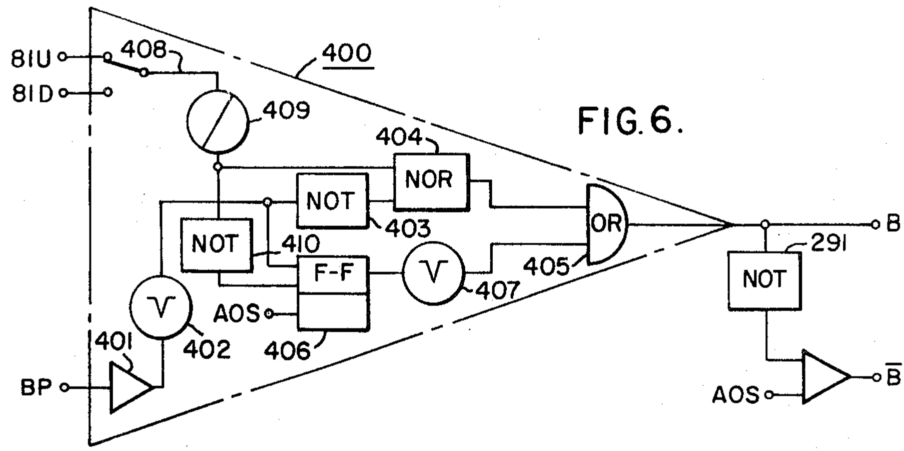
FIG. 6.
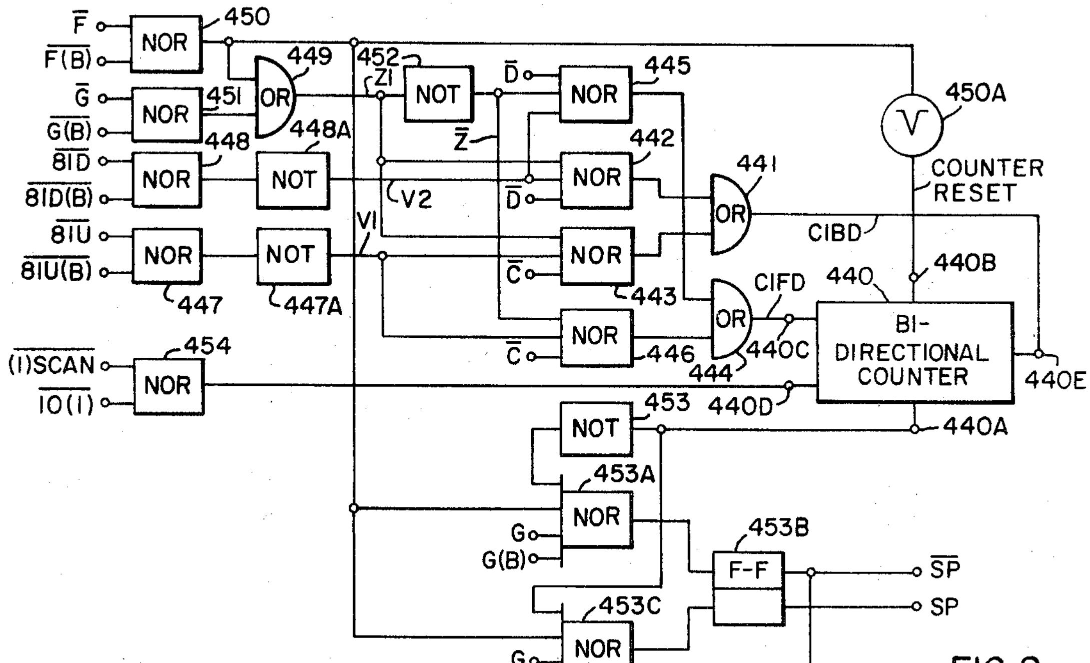
FIG. 8.
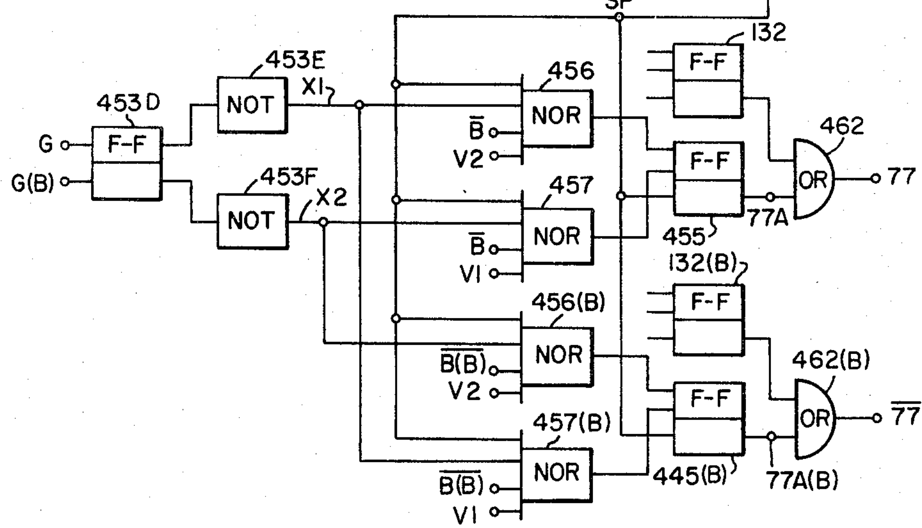

United States Patent Office 3,519,106
Patented July 7, 1970

3,519,106

PULSE-SUPERVISED TRANSPORTATION SYSTEMS

Andrew F. Kirsch, Edison, N.J., assignor to Westinghouse Electric Corporation, Pittsburgh, Pa., a corporation of Pennsylvania Filed Dec. 30, 1966, Ser. No. 606,239
Int. Cl. B66b *1/18*
U.S. Cl. 187—29 32 Claims

ABSTRACT OF THE DISCLOSURE

Repetitive pulses control the scan of registered call and car position signals in the order of landings in a vehicle system. Coincidence of signals stops an elevator car. Signals are delayed to alter the leadin stopping. Distribution of calls between cars and elsewhere controls assignment of calls to cars. Plural devices are selectively controlled over a common channel.

This invention relates to transportation systems which are supervised by signals in the form of pulses and it has particular relation to such systems employing supervising equipment employing static components.

Although aspects of the invention may be incorporated in various transportation systems the invention is particularly suitable for transportation systems employing vehicles constrained for movement in predetermined paths. The invention is especially desirable for elevator systems and will be described as applied to such systems.

In accordance with the invention an elevator system is supervised by signals part or all of which are in the form of pulses. Certain of the signals may represent positions of an elevator car with respect to the landings, stations or floors of a building or structure served by the elevator car. Other signals may represent calls for elevator service such as floor calls registered from the floors or corridors served by the elevator car and by car calls registered by passengers in the elevator car. The circuits generating these signals are interrogated or scanned periodically by logic equipment capable of ascertaining information desirable for supervising the operation of the elevator car such as the positions of calls for service relative to the location of the elevator car. The logic equipment then starts and stops the elevator car for the purpose of answering the calls for service in an efficient manner.

In an elevator system it is often desirable to provide an adequate lead of an instruction to an elevator car relative to the position of the elevator car. For example, if an elevator car is designed to operate at a high rate of speed an instruction to the elevator car for the purpose of stopping the elevator car at a floor should lead or be given well in advance of the arrival of the elevator car at such floor.

In accordance with the invention a set of signals representing one parameter such as car position pulses may be delayed for the purpose of establishing a desired lead in another set of signals representing a second parameter such as calls for service.

Should a failure in interrogation or scan equipment or in selector equipment occur, provision is made for providing an emergency operation of the elevator system. In a preferred emergency operation of this nature the car may be arranged to stop at each floor which it approaches on floor-to-floor runs.

If an elevator system includes a plurality of elevator cars, the pulse system herein disclosed lends itself to improvements in the efficiency and distribution of the elevator cars. Thus if a floor call is registered for a floor ahead of a plurality of elevator cars when a trailing elevator car has a car call registered for such floor, preferably the floor call is assigned to the trailing elevator car. As a further example, if more floor calls are registered for floors ahead of the leading elevator car than for floors between the elevator cars the leading elevator car is arranged to by-pass floor calls. As a still further example the elevator system may be arranged to sense an impending bunching of the elevator cars. Under such circumstances the leading elevator car is arranged to by-pass floor calls until it reaches the center of the demand for elevator service ahead of such car.

Because of the numerous components encountered in an elevator system the wiring of these components tends to be time consuming and costly. According to an aspect of the invention alternating current is employed for controlling such components. The components can then be arranged in pairs wherein each component of a pair is controlled by a separate polarity of the alternating current. This materially reduces the number of circuits required.

In one aspect of this polarity or half-wave signal control a half-wave command signal is compared with a half-wave reference signal. Because of certain variables such as the leakage and gain of certain static components the command half-wave may differ in duration from the reference half-wave. To make certain that these half-waves are compared only when they have proper values the invention contemplates the provision of a narrow sampling pulse or notch which permits the comparison only during a period when both half-waves are of proper value.

It is therefore an object of the invention to provide an improved pulse-controlled transportation system.

It is another object of the invention to provide an improved transportation system for scanning repetitively for signals representing the position of a vehicle and the registration of calls for service.

It is an additional object of the invention to provide an improved transportation system for minimizing bunching of vehicles.

It is a further object of the invention to provide an improved transportation system for providing adequate lead of a registered call for service relative to a vehicle destined to answer such call in a pulse system.

It is another object of the invention to provide an improved transportation system having emergency vehicle control effective upon failure of a normal supervision system for such vehicles.

Other objects of the invention will be apparent from the following description taken in conjunction with the accompanying drawings in which:

FIGS. 5 through 8 show in schematic form further circuits useful with the system of the preceding figures.

FIG. 1

Figure 1:
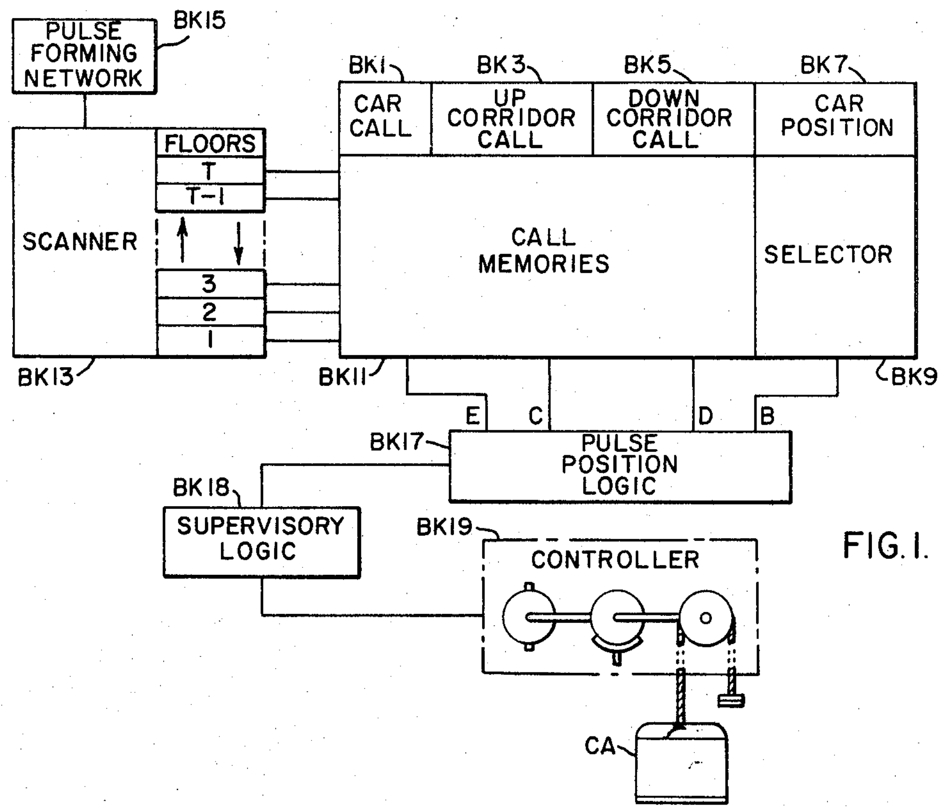
FIG. 1 is a block diagram of an elevator system embodying the invention.

In FIG. 1 an elevator system is illustrated which includes means for registering calls for service. Such calls include car calls BK1 which may be registered by passengers in an elevator car A. In addition, up corridor or floor calls BK3 and down corridor or floor calls BK5 may be registered by intending passengers located at the various floors or landings served by the elevator car. A selector BK9 is provided for developing signals dependent on car position BK7. Call memories BK11 retain signals representing calls for service until such calls are answered. The call memories are scanned or interrogated periodically in the order of the floors with which they are associated and in relation to the position of the car by means of a scanner BK13.

The scanner is controlled by pulses applied by a pulse forming network BK 15. This network supplies pulses which determine the period of the scan and pulses which are effective during each period for advancing the scan from floor-to-floor.

Information developed during each scan operates through pulse position logic BK17 and supervising logic BK18 to supply signals to a controller BK19 for controlling the operation of the elevator car CA. As examples the signals may indicate that a call is registered for a floor above the elevator car or for a floor below the elevator car or for a floor in the zone of the elevator car.

FIG. 2

As previously noted a number of signals are employed in the elevator system. Each of the signals has two states. In one state the signal has a one value whereas in the other state the signal has a zero value. If a voltage is employed, the "one value" may represent either a positive or a negative value of voltage. To facilitate an understanding of the invention a number of the signals are illustrated in FIG. 2.

The period of each scan is determined by a SET signal. In FIG. 2 a portion of the signal is plotted on coordinates wherein abscissas represent time and ordinates represent magnitudes of the signal. The SET signal provides rectangular pulses which are spaced in time sufficiently to permit a complete scanning sequence between successive SET pulses. As representatives of suitable parameters each of the SET pulses may have a duration of one millisecond. The period between successive SET pulses may be of the order of $\frac{2}{100}$ second.

Figure 2:
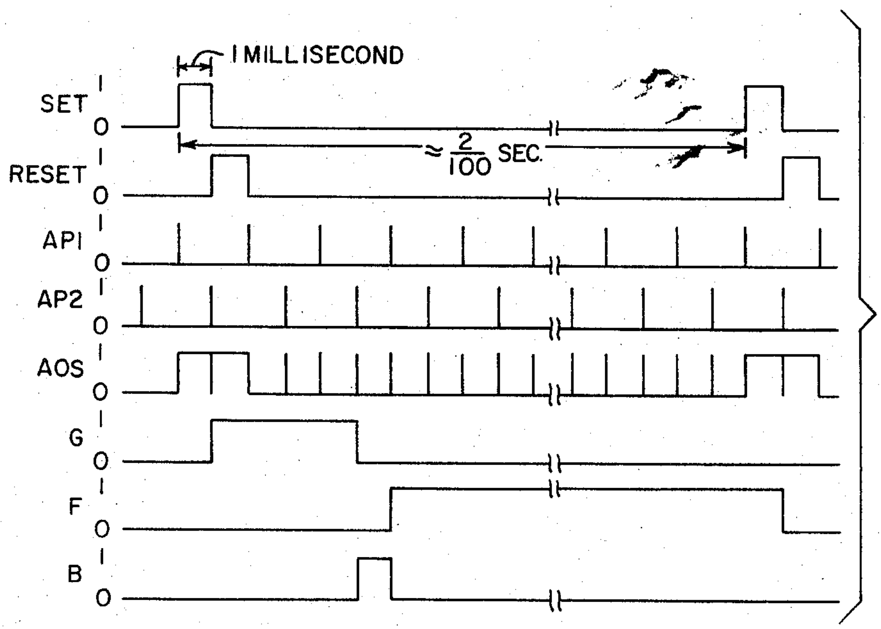
FIG. 2 is a graphical representation showing signals useful in the invention of FIG. 1.

A RESET signal is also shown in FIG. 2.

During the period of a scan the scanner may be advanced from floor-to-floor by two sets of advance pulses AP1 and AP2 which alternate with each other. Each set of advance pulses may have a suitable rate such as 500 pulses per second and each pulse may have a duration of 50 micro seconds.

The four signals SET, RESET, AP1 and AP2 are combined to produce an ADVANCE or SET signal AOS.

The scan may start at the first floor and may successively interrogate signals associated with the floors above the first floor. The same direction of scan may be employed for trips of the elevator car in both directions. Alternatively, a separate direction of scan may be employed for each direction of travel of the elevator car. Thus, for a down trip of the elevator car the scan may start at the top floor and proceed to interrogate successively the signals associated with the lower floors of the building.

A signal G has a one value as long as the scanner is scanning signals associated with floors located below the elevator car.

A signal F has a one value as long as the scanner is scanning signals associated with floors located above the elevator car.

A signal B provides a one value as the scanner is scanning the zone of the elevator car.

Although aspects of the invention may be incorporated in an elevator system arranged either for attendant operation or for automatic operation and serving a structure having any desired number of floors, the invention may be described adequately with reference to an elevator system arranged for fully automatic operation and serving a building structure having five floors. For this reason, the initial illustration and description of the invention will be directed particularly to such a system.

Though the majority of the components in the control system to be described comprise static elements, some electromagnetic switches, contactor and relays are employed in conjunction with such static elements to perform certain control functions. These switches and relays may have numerous contacts. For this reason, each of the sets of contacts of a relay, contactor or switch is identified by the reference character employed for the relay, contactor or switch followed by a numeral or suffix indicating the specific set of contacts. For example, the reference characters OP1 and OP2 indicate, respectively, the first and second sets of contacts for the door-open relay OP.

Two types of contacts are employed for the switches, contactors and relays. One type may be referred to as back or break contacts. Such contacts are closed when the associated switch, contactor or relay is deenergized and dropped out; the contacts are open when the associated switch or relay is energized and picked up.

The second type of contacts may be referred to as front or make contacts. Such contacts are open when the associated switch or relay is deenergized and dropped out, and are closed when the associated switch or relay is energized and picked up.

For reference purposes, the following list of contactors, switches and relays is set forth:

1, Up switch or contactor
2, Down switch or contactor
5, MG contactor
32R, Running relay
34KR, Stop relay
34A, Auxiliary-stop relay
29R, Door-safety relay
43R, Close-door relay
44R, Open-door relay
GD, Go-down relay
GDA, Auxiliary go-down relay
GU, Go-up relay
GUA, Auxiliary go-up relay
OP, Door-open relay
CL, Door-close relay
MGA, Auxiliary MG relay
Z, Inductor notching relay.

Figure 3:
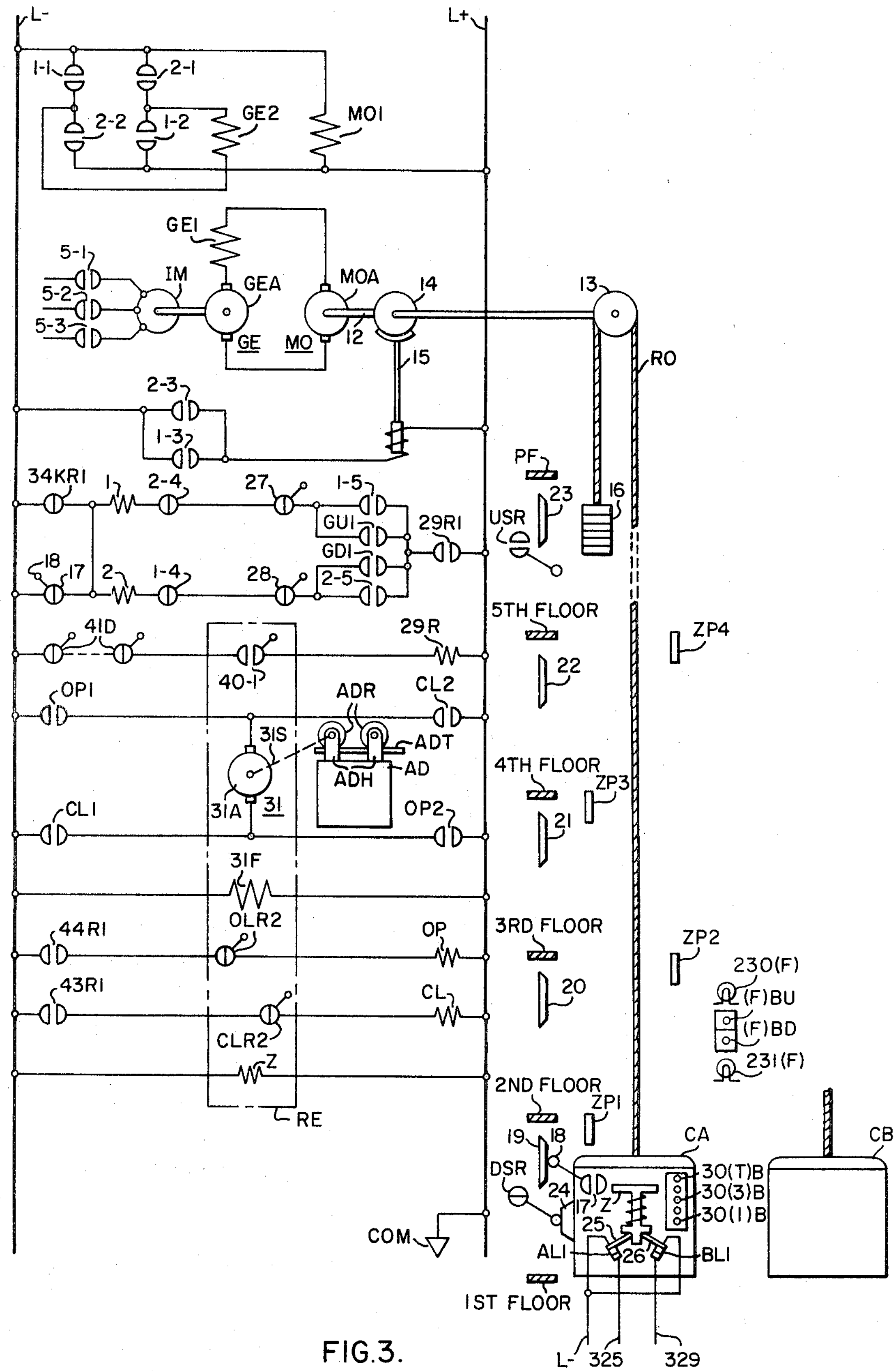
FIG. 3 is a schematic view of an elevator system embodying the invention with circuits shown in straight line form and with parts broken away.

FIG. 3 illustrates the association of an elevator car CA with the building or structure served by the elevator system. The CA is assumed to be stopped at the first floor of the building.

The building is provided with a penthouse having a floor PF on which certain apparatus of the elevator system is mounted. Thus, for the car CA, an electric motor MO is provided having a shaft 12 on which is mounted a traction sheave 13 and a brake drum 14. A brake 15 of the spring-applied magnetically-released type commonly employed for elevator systems cooperates with the brake drum 14 to stop or permit rotation of the motor MO.

The elevator car is connected to a counterweight 16 through one or more flexible ropes or cables RO which pass over the sheave 13.

Movement of the elevator car CA is utilized to operate certain mechanical switches. To this end, a switch 17 is secured to the car. This switch is biased to its closed position and has a cam follower 18, which is disposed to engine cams 19, 20, 21, 22 and 23. These cams are mounted in the hoistway within which the elevator car operates. Thus, as the car travels up and down the hoistway the cam follower 18 engages its associated cams to open the switch 17 when the car is in predetermined positions. Opening of the contacts of the switch 17 in this manner is utilized to control stopping operations of the elevator car at the various floors of the structure which it serves.

In addition, there is mounted on the elevator car CA a cam 24 for the purpose of engaging cam followers of mechanical switches DSR and USR. These switches are biased to their open positions. The cam 24 engages the cam follower for the switch DSR to close the switch as the elevator car stops at the lower terminal or first floor landing to indicate that the car is located at such landing. Similarly, the cam 24 engages the cam follower for the switch USR as the elevator car stops at the upper terminal or fifth floor landing to indicate that the elevator car is located at such landing.

The elevator car CA carries an inductor notching relay Z which is utilized to produce notching signals as the elevator car travels in its hoistway. This relay may be of a conventional type and is mounted on the car in a position to pass adjacent each of a plurality of inductor plates ZP1, ZP2, ZP3 and ZP4 of magnetic material mounted in the hoistway. The inductor plates are so positioned that the inductor notching relay Z comes into horizontal alignment with one of the plates when the elevator car is half-way between floors.

The relay Z has two break contacts AL1 and BL1. These contacts remain closed after the coil of the inductor relay is energized until the relay during movement of the elevator car comes into horizontal alignment with one of its associated inductor plates. The contacts AL1 and BL1 are provided with contact operating armatures 25 and 26, respectively.

If the coil of the inductor notching relay Z is energized, such energization alone is insufficient to open either of the contacts AL1 or BL1. If the inductor relay while its coil is energized reaches one of the inductor plates ZP1 or ZP3, a magnetic circuit is completed which results in opening of the break contacts AL1. The contacts AL1 momentarily open while the relay Z is opposite one of the inductor plates ZP1 or ZP3 but immediately reclose when the inductor relay passes beyond such plate. Similarly, if the inductor relay Z while its coil is energized reaches one of the inductor plates ZP2 or ZP4, a magnetic circuit is completed which results in opening of the break contacts BL1. Thus, when the relay is moved past one of the plates ZP2 or ZP4, the contacts BL1 momentarily open while the relay is opposite such plate but immediately reclose when the inductor relay passes beyond such plate. It will be appreciated, therefore, that as the elevator car moves between terminal floors the break contacts AL1 and BL1 alternately open as the car proceeds from a position half-way between a pair of adjacent floors to a position half-way between the next pair of adjacent floors in the direction of car travel. The armatures 25 and 26 of the break contacts AL1 and BL1 are connected to a bus L−, which represents the negative side of a suitable direct-current source.

The elevator car CA also contains a car station provided with a plurality of car call push buttons 30 (1) B to 30 (T) B which may be operated to register calls for floors desired by passengers within the elevator car. The reference character enclosed in parenthesis denotes the floor. For example, the push button 30 (1) B may be operated to register a call for the first floor. In a similar way, the push buttons 30 (2) B to 30 (T) B may be operated to register calls for the second floor to the top floor, respectively.

In order to permit prospective passengers located at the various floors served by the elevator car to register calls for elevator service, a suitable push-button station is located at each of the floors. Each of the push-buttons for registering a call for up service is identified by the reference character (F)BU the letter (F) denoting the floor with which the push-button is associated. In an analogous manner, each of the push-buttons associated with a floor from which a down call may be registered is identified by the reference character (F)BD. Thus, the floor push-button station for the second floor includes an up floor or corridor call push-button 2U and a down floor or corridor call push-button 2D.

Reference characters 230 (F) and 231 (F) designate up and down call-registered lamps, respectively. Illumination of one of the lamps indicates registration of a call for the floor and in the direction with which the lamp is associated.

The elevator motor MO is arranged in a conventional variable voltage or Ward-Leonard system. The motor is of a direct-current type and has its armature MOA connected in a loop circuit with the armature GEA of a direct-current generator GE and a series field winding GE1 associated with the generator GE. The motor MO has a field winding MO1 connected across the direct-current buses L− and L+. The armature of the generator GE is mounted on a common shaft with the armature of a three-phase induction motor IM which is connected for energization form a source of three-phase energy (not shown) through make contacts 5–1, 5–2 and 5–3 of a motor-generator contactor 5.

The direction of movement of the elevator car is determined by the polarity of energization of a field winding GE2 of the generator GE. This field winding is connected across the buses L− and L+ of the direct-current source through a reversing switch which is formed by make contacts 1–1, 1–2, 2–1, and 2–2 of the up and down contactors 1 and 2. If the up contactor 1 is energized and picked up the energization of the field winding GE2 is suitable for up travel of the elevator car CA. If the down contactor 2 is energized and picked up the field winding GE2 is energized with proper polarity for down travel of the elevator car CA.

The release winding of the brake 15 is connected across the buses L− and L+ either through make contacts 1–3 of the up contactor or make contacts 2–3 of the down contactor. Consequently, if either of these contactors is energized and picked up the brake 15 is released to permit movement of the elevator car CA.

Energy for the elevator-car control circuits is derived from a suitable direct-current source, heretofore mentioned, represented by the buses L− and L+, the latter of which is connected to common conductor COM. Although ground is often employed as a common conductor it will be assumed that a separate conductor is here employed.

Before the elevator car CA can move, make contacts 29R1 of the door-safety relay 29R must be closed to indicate that all of the doors associated with the elevator car CA are in safe or closed condition. Under these circumstances, one of the contactors 1 or 2 may be energized. If the car is at the lower-terminal floor conditioned for up travel, the car may be started through the circuit,

L−, 34KR1, 1, 2–4, 27, GU1, 29R1, L+

Closure of the break contacts 34KR1 indicates that the elevator car is in condition to be started. Under the assumed conditions, a mechanical limit switch 27 is closed. The limit switch 27 is normally biased in closed position and is cam operated to open as the elevator car nears its upper limit of travel. If the car is set for up travel and if a call is registered which may be answered by the elevator car, the make contacts GU1 also are closed. When the up contactor 1 picks up, its break contacts 1–4 open to prevent subsequent energization therethrough of the down contactor 2. Energization of the up contactor also results in the closure of its make contact 1–5 to establish a holding circuit around the contacts GU1.

If the elevator car is at the upper-terminal floor, the down contactor 2 may be energized through the circuit

L−, 34KR1, 2, 1–4, 28, GD1, 29R1, L+

Under the assumed conditions, the contacts of a mechanical limit switch 28 and the make contacts 29R1 are closed. The limit switch 28 normally is biased in closed position and is cam operated to open as the elevator car nears its lower limit of travel. If the elevator car is set for down travel the make contacts GD1 are closed.

Pick up of the down contactor 2 results in opening of its break contacts 2–4 to prevent subsequent energization therethrough of the up contactor 1. Closure of the make contacts 2–5 establishes a holding circuit around the contacts GD1.

The remaining circuits illustrated in FIG. 1 all are associated with the doors provided for the elevator car, with the exception of the circuit for the coil of the inductor notching relay Z. The car is provided with a door AD of a conventional type mounted for horizontal sliding movement by means of a pair of hangers ADH and a pair of rollers ADR on a track ADT, which is suitably secured to the car CA. It will be understood that a hoistway door of a conventional type may be employed if desired at each floor served by the elevator car.

All of the components container within a broken-line rectangle RE in FIG. 3 are mounted on the elevator car CA. Thus, a car-mounted mechanical switch 40–1 is employed for controlling energization of the door-safety relay 29R. The switch 40–1 is a limit switch which is normally biased in open condition and is cam operated to close when the elevator-car door is in its fully closed position. Likewise, a cam-operated normally-open limit switch 41D is provided for each hoistway door. Each such 41D switch is closed when its associated hoistway door is in its fully closed position. Consequently, the door safety relay cannot be energized and picked up unless all of the door limit switches associated therewith are in closed condition.

To operate the elevator car door AD, a car door motor 31 is provided. The motor 31 is provided with a shaft 31S, which is suitably coupled to the elevator car door. The motor has an armature 31A, which may be reversibly energized through make contacts of the door-open relay OP and the door-close relay CL. Thus, when the door-open relay is energized and picked up, its make contacts OP1 and OP2 are closed to energize the armature 31A such that the shaft 31S rotates in the proper direction for opening the car door. When the door-close relay is energized and picked up, its make contacts CL1 and CL2 close to energize the armature 31A in the proper direction for closing the elevator car door. The field 31F of the car door motor is connected permanently across the buses L— and L+. The door motor 31 also may be utilized to open and to close the hoistway doors provided for the elevator car through any conventional car and hoistway door-coupling means, such as a vane and drive block arrangement which is well known in the art.

The coil of the inductor notching relay Z is connected permanently to the buses L— and L+. It will be recalled that the operation of the break contacts of the inductor notching relay is controlled by the position of this relay with respect to the inductor plates ZP1 through ZP4 which are disposed in the elevator car hoistway.

If the elevator car CA is part of a bank having additional elevator cars, such as the car CB, similar circuits and components would be provided for each of the elevator cars with the exception that the circuits for registering corridor or floor calls as represented by the pushbuttons (F)BU and (F)BD would be common to all of the elevator cars in the bank.

FIGS. 4–4Q

Figure 4:
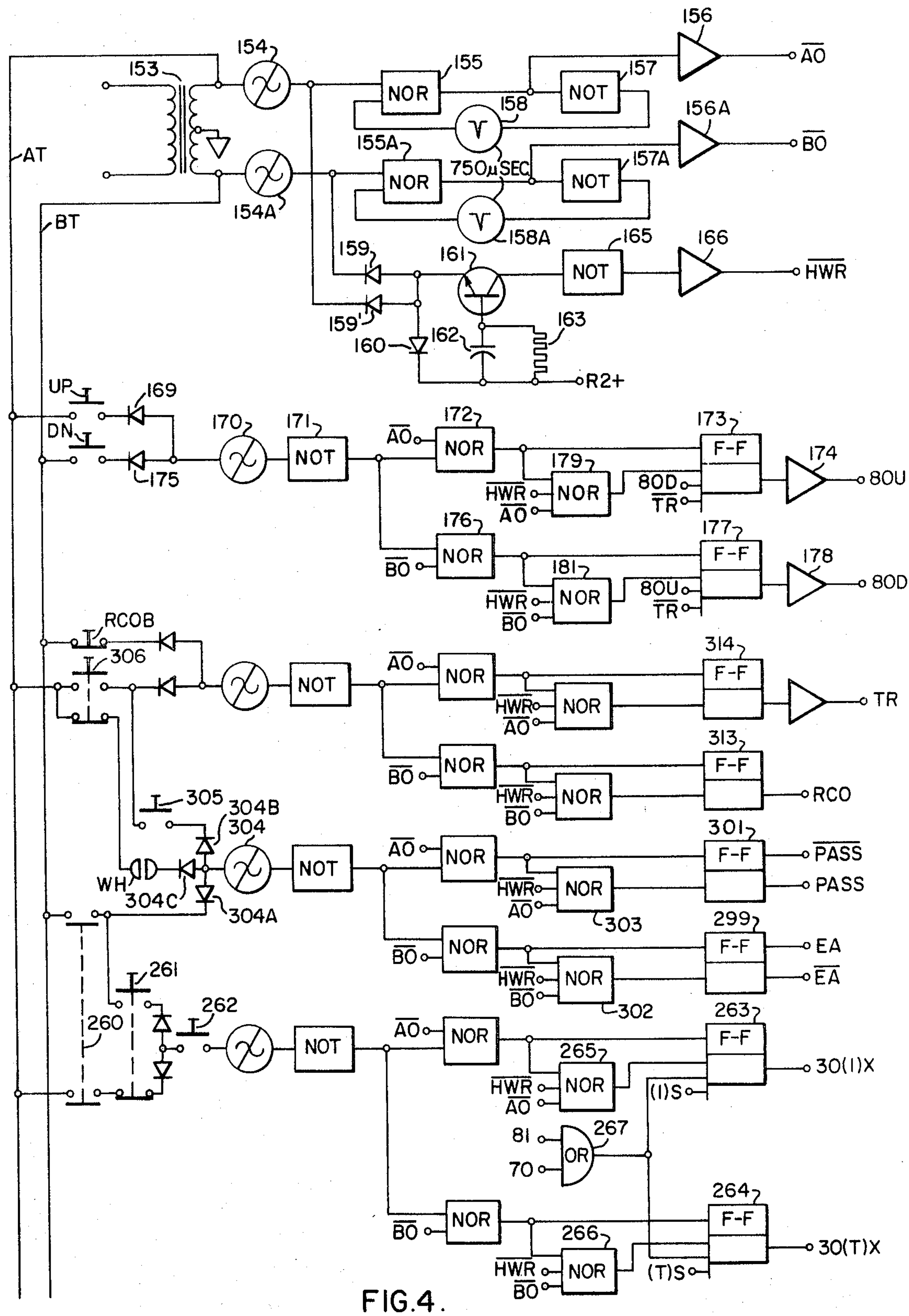
FIGS. 4 through 4Q show in schematic form circuits suitable for the system of FIG. 3.
Figure 4B:
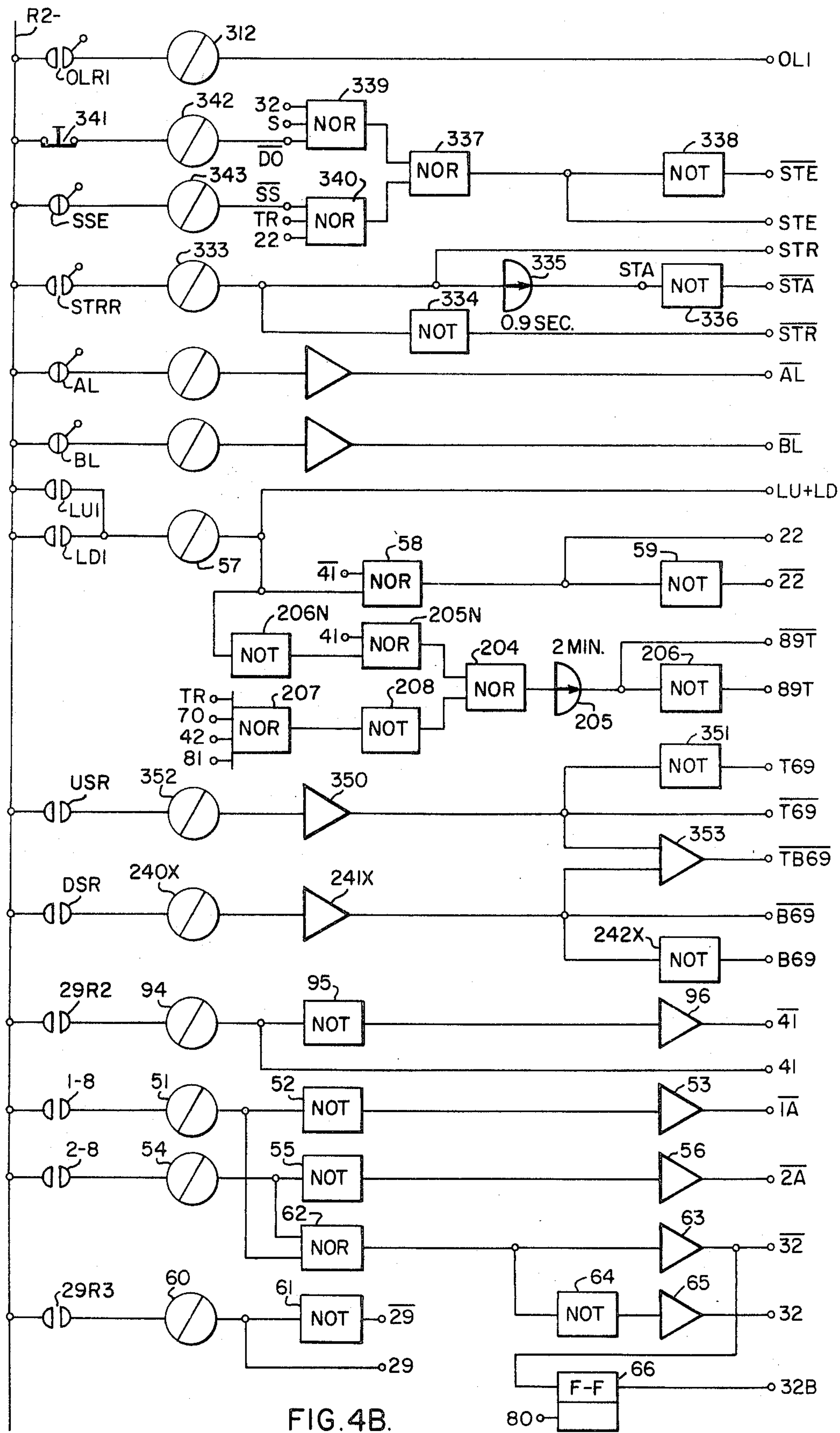
Figures 4C, 4D:
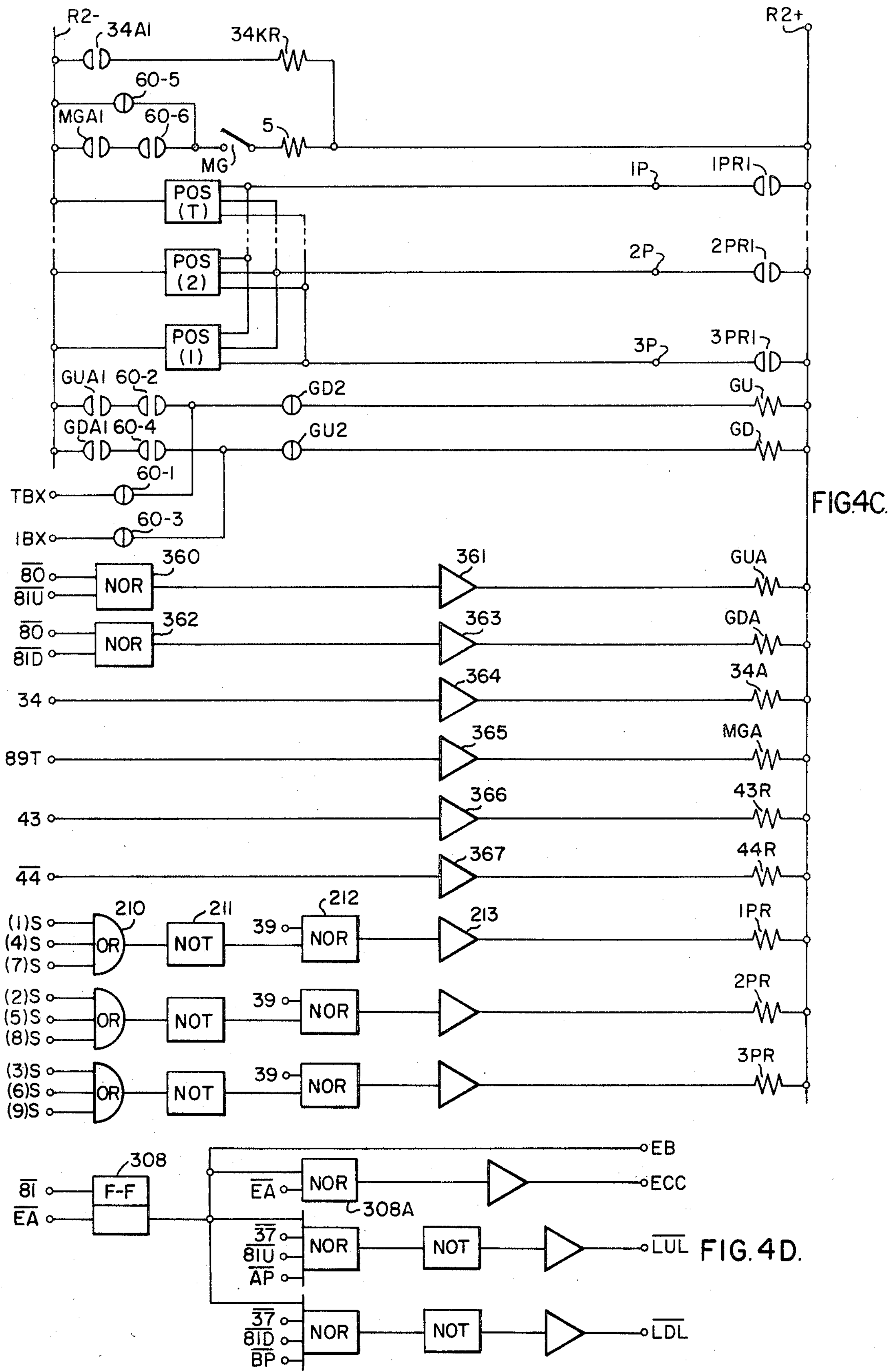

In the figures now to be described a large number of logic components or elements and a large number of auxiliary components or elements are employed. FIGS. 4–4Q represent portions of a complete elevator system. The various components have terminals for receiving or delivering input or output signals.

The input and output signals of the logic components are in the conventional binary form in which each signal has a value of zero or a value of one. Each of the components or elements is represented by a distinctive symbol. For convenience representative symbols are listed as follows:

72 (FIG. 4M) represents an amplifier. This amplifier has an output signal $\overline{34}$ and at least one input signal **72*a*. A reference character with a bar (e.g. $\overline{34}$) represents in a conventional manner a signal which is the reverse of a signal represented by the reference character without the bar (i.e. 34). In the specific illustration two input signals 72*a* and 72*b*** are employed either of which when present provides the output $\overline{34}$.

57 (FIG. 4B) represents an attenuator element.

67 (FIG. 4M) represents a NOR element which has an output 34. This NOR element has a plurality of inputs **67*a* and 67*b*. If either of the input signals has a one value or if all of the input signals have a one value the output signal 34 has a zero value. If none of the input signals has a one value the output signal 34** has a one value.

142 (FIG. 4G) represents a MEMORY element having a "set" input terminal **142*a* and a "reset" input terminal 142*b* to each of which one or more input signals may be applied. When an input signal designated a "set" signal is applied to the terminal 142*a* two output terminals are so controlled that a zero output signal $\overline{78U}$ is applied to the upper output terminal and a one output signal 78U is applied to the lower output. This output condition continues until a "reset" signal is applied to the terminal 142*b***. Under these circumstances the upper output signal becomes one and the lower output signal becomes zero.

The MEMORY element may be of the type known as a "Flip Flop" and may comprise two NOR elements interconnected in a well known manner. When plural inputs are supplied to the "set" or "reset" terminal such inputs may be decoupled from each other in the same manner by which NOR element inputs are conventionally decoupled.

217 (FIG. 4J) denotes a pulse shaper element. The legend adjacent the symbol indicates the duration of the pulse produced by the pulse shaper element. Thus, if an input is applied to the left-hand input terminal of the element 217 an output pulse of 250 microseconds duration is derived from the right-hand output terminal of the element.

113 (FIG. 4E) designates an OR element. Such an element has a plurality of input terminals. Thus, the element 113 receives two signals $\overline{45T}$ and $\overline{STE}$. The presence of either or both of these input signals with a one value produces a one output signal from the right-hand output terminal of the OR element.

120 shows a DELAY element. The legend applied to this element indicates the time delay introduced by the element. Thus an input signal applied to the left-hand terminal of the element 120 results in an output signal from the right-hand output terminal of the element after a delay of eight seconds.

106 represents a NOT element. When a zero input signal is applied to the left-hand input terminal of the NOT element 106 a one output signal is derived from the right-hand output terminal of the element. Conversely, if a one input signal is applied to the left-hand terminal of the element a zero output signal is derived therefrom.

170 (FIG. 4) represents a low pass attenuator. It is designed to pass input frequencies applied to its left-hand input terminal of the order of 60 to 120 cycles per second and to attenuate frequencies higher than 120 cycles per second.

A number of signals generated in the system now will be presented together with a brief discussion of the generation of each of the signals. Terminals for receiving or delivering a common signal are connected together. However, to eliminate the confusion introduced by the numerous connection conductors, these have been omitted, and each terminal is provided with the reference character of the associated signal.

Each of the following sections is introduced by the reference character employed for a signal or the reference characters employed for related signals followed by a designation of the figure in which the signal or signals may be found.

$\overline{1A}$ (FIG. 4B) up signal when zero indicates that the elevator car is conditioned to run in the up direction. Under such circumstances the up contactor 1 has make contacts 1–8 closed to supply an input to a circuit having in succession an attenuator 51, a NOT element 52, an amplifier 53 and the terminal for the up signal $\overline{1A}$.

$\overline{2A}$ (FIG. 4B), down signal where zero indicates that the car is conditioned to run in the down direction. When make contacts 2–8 of the down contactor 2 are closed an input is applied to a circuit having in succession an attenuator 54, a NOT element 55, an amplifier 56, and the terminal for the down signal $\overline{2A}$.

22, $\overline{22}$ (FIG. 4B) door preopen signal, reopens the elevator car doors when the car reaches a leveling zone. Under such circumstances up leveling contacts LU1 or down leveling contacts LD1 close to supply through an attenuator 57 a one input to a NOR element 58. A second input $\overline{41}$ to the NOR element has a zero value when the doors are closed. The output of the NOR element 58 supplies the signal 22 and through a NOT element 59 supplies $\overline{22}$. Leveling contacts are shown in the Savage Pat. 2,657,765.

29, $\overline{29}$ (FIG. 4B), safety signal. It is conventional practice to provide an elevator with a relay which indicates when the elevator is in a safe condition to run. When the elevator is safe to run the make contacts 29R3 close to develop the safety signal 29 through the attenuator 60 and the safety signal $\overline{29}$ through the attenuator 60 and the NOT element 61.

32, $\overline{32}$ (FIG. 4B) designate a running signal which indicates when the elevator is in condition to run. The outputs of the attenuators 51 and 54 supply inputs to a NOR element 62. The output of the NOR element 62 supplies the running signal $\overline{32}$ through an amplifier 63 and supplies the running signal 32 through a NOT element 64 and an amplifier 65 in succcession.

32B (FIG. 4B) indicates that the elevator is running and is deenergized when leveling. This signal is derived from the upper output of a MEMORY element 66 having the running signal $\overline{32}$ connected to its set terminal. A master call signal 80 is connected to the reset terminal of the MEMORY element 66.

34, $\overline{34}$ (FIG. 4M), stop signal. The stop signal 34 is derived from the output of a NOR element 67 having two inputs derived respectively from the outputs of the NOR elements 68 and 69. Each of the NOR elements 68 and 69 derives one input from the output of a NOR element 69A having three inputs. One of these three inputs is an auxiliary stop signal $\overline{34X}$, the second of these inputs is a notch signal $\overline{39}$ and the third is a selector advance signal SA. If the auxiliary stop signal $\overline{34X}$ is zero during a selector notch as determined by a zero value of the notch signal $\overline{39}$, and if the selector advance signal is zero, a stop signal is generated. A second input for the NOR element 68 is derived from the output of a NOR element 71 which has one input supplied by the stop signal $\overline{34}$. An auxiliary non-interference signal $\overline{70}$ supplies a second input to the NOR element 71. Thus, after a stop signal is generated ($\overline{34}=0$) it is held during the noninterference time ($\overline{70}=0$). A third input to the NOR element 68 is supplied by the door master signal $\overline{45}$ which has a one value when the doors are to open.

The NOR element 69 receives a second input from the running signal 32. A third input is derived from the output of a NOR element 71A. Two inputs for this NOR element are supplied by a down attendant signal 80D and an up attendant signal 80U. The outputs of the NOR elements 68 and 69 provide two inputs for an amplifier 72 the output of which supplies the stop signal $\overline{34}$. A signal having a one value on either input for the amplifier 72 supplies a one value for the stop signal $\overline{34}$.

$\overline{34X}$ (FIG. 4M), auxiliary stop signal. This signal is derived from the output of a NOR element 73 having four inputs. Three of these inputs are supplied by the auxiliary stop signals 34XA, 34XB, and 34XC. The fourth input is supplied by a substitute stop signal SSO which is effective when a system selector or scanner fails to operate properly for the purpose of initiating the stop of the elevator car at the end of each floor run.

34XA (FIG. 4M) auxiliary-stop signal. This signal indicates that the elevator car should stop for a floor or corridor call for service in the direction for which the elevator is set. This signal forms the output of a NOR element 75 having three input signals. One of these is supplied by a by-pass signal 77 which prevents a loaded elevator car from stopping in response to a corridor call. A second input signal EB indicates that the elevator is on emergency operation. A third input is derived from the output of a NOR element 76 having two inputs derived respectively from the outputs of two NOR elements 76A and 76B. The NOR element 76A is controlled by three input signals which are the auxiliary up signal $\overline{1A}$, a car-position signal $\overline{B}$ and an up-call signal $\overline{C}$. The NOR element 77B is controlled by the auxiliary down signal $\overline{2A}$, the car-position signal $\overline{B}$ and a down-call signal $\overline{D}$.

34XB (FIG. 4M), auxiliary-stop signal, represents the output of a NOR element 79 which conditions the elevator car to stop for car calls. This NOR element has three input signals which are a car-call signal $\overline{E}$, a car-position signal $\overline{B}$ and a running signal $\overline{32}$.

34XC (FIG. 4M), auxiliary stop signal, controls the stopping of the elevator car for certain non-normal conditions. Three NOR elements 82, 82A and 82B have their outputs connected through an OR element 82C to a terminal supplying the auxiliary stop signal 34XC. Thus a one output from any one of the three NOR's provides a one value for the signal 34XC.

The NOR element 82 has inputs supplied by the auxiliary up signal $\overline{1A}$ and the up signal 81U. The NOR element 82A has inputs supplied by the auxiliary down signal $\overline{2A}$ and the down signal 81D. The NOR element 82B has one input supplied by the running signal $\overline{32}$ and a second input derived from the output of a NOR element 83. The NOR element 83 receives a first input (1)S corresponding to the presence of the elevator car adjacent the lower terminal or first floor. The NOR element receives a second input corresponding to a signal (T)S representing the presence of the elevator car adjacent the upper terminal floor.

$\overline{37}$ (FIG. 4F), lantern signal, permits the illumination of an appropriate hall lantern, if employed, as the elevator car stops. This signal is derived from a MEMORY element 84 having a first set input provided by the master call signal $\overline{80}$ and a second set input derived from the output of a NOR element 85. The NOR element 85 has a first input provided by the notch signal 39 and a second input provided by the stop signal $\overline{34}$. A reset signal OL1 is provided for the MEMORY element 84 when the elevator car doors are fully open.

39, $\overline{39}$ (FIG. 4M), notch signal. The notch signals are derived from the outputs of a MEMORY element 86, an amplifier 87 being employed for one of the signals. The MEMORY element 86 is set by either of two selector advance signals SA1 or SA2. The output of the NOR element 89 is employed for resetting the MEMORY element 86. The signal 39 has a one value when the system is notching.

The NOR element 89 receives four input signals derived from the outputs of four NOR elements 90, 91, 92 and 93. The NOR element 90 receives as its input signals the auxiliary up signal $\overline{1A}$ and a notch control signal $\overline{AL}$. The signal $\overline{AL}$ is produced by a switch on the elevator car which is opened briefly each time the elevator car goes up from an odd to an even landing or floor or when the car goes down from an even to an odd landing or floor.

The NOR element 91 has provided as inputs the auxiliary down signal $\overline{2A}$ and a notch control signal $\overline{BL}$. The signal $\overline{BL}$ is produce in a manner analogous to the signal $\overline{AL}$ except that its controlling switch operates each time the car moves from an even to an odd landing or floor when set for up travel or when the car moves frm an odd to an even landing or floor when the car is set for down travel.

Some benefits are derived from double notching systems wherein two $\overline{AL}$ and two $\overline{BL}$ signals are produced per floor as shown in FIG. 4Q wherein abscissas represent floor spacings and ordinates represent signals $\overline{AL}$ and $\overline{BL}$. Such double signals may be generated by replacing each of the inductor plates ZP1 to ZP2 by two inductor plates positioned to provide successive notching signals between each pair of floors.

When the elevator car leaves a floor the first $\overline{AL}$ or $\overline{BL}$ signal going to zero generates a selector advance pulse to notch the selector. Each of the double signals $\overline{AL}$ or $\overline{BL}$ produces a separate notch signal $\overline{39}$ to release a gate for the stop signal 34. Thus a decision to stop may also be made at the last feasible point on an extended floor run.

41, $\overline{41}$ (FIG. 4B), door-open signal. The signal 41 is produced through the attenuator 94 in response to operation of make contacts 29R2 of the safety relay 29R which in turn is controlled by the contacts 40–1 and 41D associated with the elevator car and hoistway doors. The signal $\overline{41}$ is derived from the attenuator 94 through a NOT element 95 and an amplifier 96.

42 (FIG. 4I) is an auxiliary-door-open signal derived from the output of a NOR element 97, and is utilized for opening the car doors when the car is parked at a floor where a corridor or floor call originates. The NOR element 97 has four inputs a first one being the door-open signal $\overline{41}$, a second signal being the auxiliary-non-interference signal 70 and a third being an attendant-transfer signal TR. The fourth input is derived from the output of a NOR element 98 having two inputs derived respectively from the outputs of the NOR elements 99 and 100.

The NOR element 99 has four inputs, a first input being the down-call signal $\overline{D}$, a second input being the car-position signal $\overline{B}$ and a third input is derived from the output of an OR element 101 having two inputs which are a leveling deenergized signal 32B and a door-full-open signal 42A. The fourth input for the NOR element 99 is derived from the output of a NOR element 102 having a first input supplied by the up signal $\overline{81U}$ and a second signal derived from the output of a NOR element 103. The NOR element 103 has a first input supplied by the transfer signal TR and a second input if directional cancelling is required. This would be a one input.

The NOR element 100 has a first input provided by an up-call signal $\overline{C}$, a second input provided by the car-position signal $\overline{B}$, a third input derived from the output of the OR element 101 and a fourth input derived from the output of a NOR element 104.

The NOR element 104 has a first input supplied by the down signal $\overline{81D}$ and a second input derived from the output of the NOR element 103.

The signal 42 is utilized in genearting the MG signal immediately to start the MG set, in genearting the full-open signal 42A which is reset when the doors have fully opened, in resetting the non-interference signal 70T and the added-time signal $\overline{70AT}$ to zero, in generating the auxiliary-non-interference signal 70 when the signal 70T goes to one and in coacting to generate the door-master signal $\overline{45}$ to open the doors.

The signal 42 cannot be generated on attendant operation (TR=1), or if the doors are open ($\overline{41}$=1) or if the auxiliary-non-interference signal 70=1.

42A (FIG. 4F) is a door-full-open signal derived from the lower-output terminal of a MEMORY element 105. The auxiliary-door-open signal 42 is applied to the set terminal of the MEMORY element whereas the reset terminal is energized by an auxiliary-full-open signal OL1 which has a one value when the elevator doors are fully open.

Figure 4E:
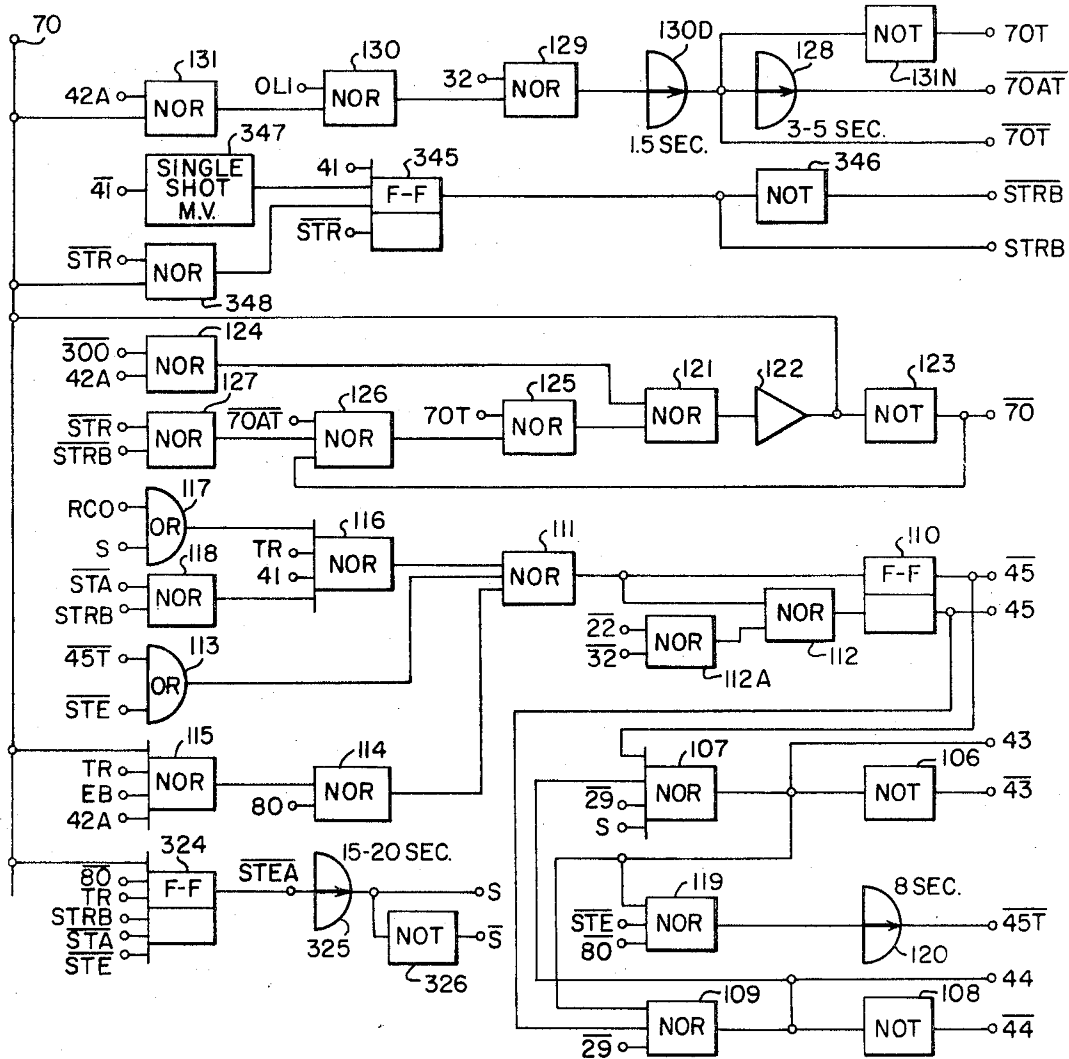

43, $\overline{43}$ (FIG. 4E). A close-door signal $\overline{43}$ is derived from the output of a NOT element 106 which has its input supplied from the output of a NOR element 107. This NOR element has a first input provided by the safety signal $\overline{29}$, a second input provided by the open door signal 44, a third input provided by the door-master signal $\overline{45}$ and a fourth input derived from the positive-close signal S. The output of the NOR element 107 also provides the close-door signal 43.

44, $\overline{44}$ (FIG. 4E). The open-door signal $\overline{44}$ is derived from the output of a NOT element 108 having its input supplied from the output of a NOR element 109. The NOR element 109 has a first input supplied by the safety signal $\overline{29}$, a second input supplied by the close-door signal 43 and a third input supplied by the door-master signal 45. The output of the NOR element 109 also supplies the open door signal 44.

45, $\overline{45}$ (FIG. 4E) door-master signals are supplied by the two outputs of a MEMORY element 110. The set terminal of the MEMORY element 110 is energized from the output of a NOR element 111. The reset terminal of the MEMORY element 110 is energized from the output of a NOR element 112. This NOR element has a first input derived from the output of the NOR element 111 and a second input supplied by the output of a NOR element 112A which has a first input supplied by the running signal $\overline{32}$ and a second input supplied by the door-preopen signal $\overline{22}$.

A first input is supplied to the NOR element 111 by the output of an OR element 113. The OR element has a first input supplied by a tardy-close signal $\overline{45T}$ and a second input supplied by a door-reopen signal $\overline{STE}$.

A second input is supplied to the NOR element 111 from the output of a NOR element 114 which has a first input supplied by a master-call signal 80 and a second input derived from the output of NOR element 115. The NOR element 115 has a first input supplied by the auxiliary-non-interference signal 70, a second input supplied by the transfer signal TR, a third input supplied by the energency-transfer signal EB and a fourth input supplied by the full-open signal 42A.

A third input for the NOR element 111 is derived from the output of a NOR element 116. The latter NOR element has a first input supplied by the transfer signal TR, a second input derived from the door-open signal 41, a third input derived from the output of an OR element 117 and a fourth input derived from the output of a NOR element 118. One input for the OR element 117 is provided by the positive-close signal S and a second input is provided by a manually controlled signal RCO. The NOR element 118 receives one input from an interrupted-beam signal STRB and a second input from an auxiliary-block-beam signal $\overline{STA}$ which indicates that a light beam across the elevator car doorway has been interrupted for a predetermined time.

$\overline{45T}$ (FIG. 4E) is a tardy-close signal energized from the output of the NOR element 119 through a time delay element 120. The NOR element 119 receives a first input from the slow-close signal $\overline{STE}$, a second input from a close-door signal 43 and a third input from the master-call signal $\overline{80}$.

70, $\overline{70}$ (FIG. 4E). The auxiliary-non-interference signal $\overline{70}$ is derived from the output of a NOR element 121 through an amplifier 122 and a NOT element 123. The output of the amplifier 122 also supplies the signal 70.

When the car stops at a floor during automatic operation, it is held at the floor for at least a "non-interference" time to permit passenger transfer. At the end of the effective non-interference time the signal 70 goes to zero.

Two inputs for the NOR element 121 are provided by the outputs of the NOR elements 124 and 125. The NOR element 124 receives an input from the time-cutout signal $\overline{\mathbf{300}}$ and a second input from the full-open signal 42A.

A first input to the NOR element 125 is provided by the non-interference signal 70T and the output of the NOR element 126 provides a second input to the NOR element 125.

The NOR element 126 receives a first input from the auxiliary-non-interference signal $\overline{\mathbf{70}}$, a second input from an added-time signal $\overline{\mathbf{70AT}}$ and a third input from the output of the NOR element 127. A light signal $\overline{\text{STR}}$ provides a first input for the NOR element 127 and the block-beam signal $\overline{\text{STRB}}$ provides a second input.

$\overline{\mathbf{70AT}}$ (FIG. 4E) is an added-time signal derived from the non-interference signal $\overline{\mathbf{70T}}$ through a delay element 128. When the delay element 130D is reset ($\overline{70T}=0$) the delay element 128 is reset to zero. When the delay element 130D times out ($\overline{70T}=1$) the delay element 128 starts to time out, and after 3–5 seconds $\overline{70AT}=1$. It provides additional door-open time under certain conditions.

70T, $\overline{\mathbf{70T}}$ (FIG. 4E). The non-interference signal 70T is derived from the output of a NOR element 129 through a delay element 130D and a NOT element 131N. The delay element 130D also supplies the non-interference signal $\overline{\mathbf{70T}}$.

The running signal 32 supplies one input for the NOR element 129 and a second input is derived from the output of a NOR element 130.

The NOR element 130 receives a first input from the auxiliary-full-open signal OL1 and a second input from the output of the NOR element 131. The NOR element 131 receives a first input from the full-open signal 42A and second input from the auxiliary-non-interference signal 70.

The delay element 130D is reset each time the car runs (32=1) or a parked car is instructed to open its doors for a corridor call (42=1). The delay element starts timing when the car is not running (32=0) and the doors are fully open (OL1=1). When the delay element times out $\overline{70T}=1$ and 70T=0.

77, (FIG. 4K) is a by-pass signal derived from the lower output terminal of a MEMORY element 132 through an OR element 462. For present purposes it will be assumed that the remaining inputs for the OR element are not utilized. This element will be discussed further in connection with FIG. 8.

The set terminal of the MEMORY element 132 is energized from the output of a NOR element 133 or from an auxiliary-time signal $\overline{\text{W5T}}$. The reset terminal of the MEMORY element 132 is energized from the output of a NOR element 134 which receives a first input from the auxiliary-time signal $\overline{\text{W5T}}$, a second input from the stop signal $\overline{\mathbf{34}}$, a third input from the running signal $\overline{\mathbf{32}}$ and a fourth input from the output of the NOR element 133.

A first input for the NOR element 133 is derived from the transfer signal $\overline{\text{TR}}$ and a second input is derived from the output of a NOT element 135. The output for the NOT element 135 is derived from an auxiliary-by-pass-signal PASS.

78D, $\overline{\mathbf{78D}}$ (FIG. 4G) are call-below signals indicating presence of an up or down corridor or floor call below the position of the elevator car or a down corridor floor call at the position of the car. These signals are derived from the two output terminals of a MEMORY element 136. The set terminal of the MEMORY is energized from the lower output terminal of a MEMORY element 137. The reset terminal of the MEMORY 136 is energized by a bottom signal $\overline{\mathbf{B69}}$ when the elevator car is adjacent its lower limit of travel or by the output of a NOR element 138. The NOR element 138 has one input derived from a $\overline{\text{SET}}$ or RESET signal and a second input derived from the lower output of the MEMORY element 137.

The set terminal of the MEMORY element 137 is energized from the output of either of the NOR elements 139 or 140. The reset terminal of the MEMORY element 137 is energized by a reset signal RESET.

The NOR element 139 receives a first input from the output of a NOR element 141, a second input from the scan-below signal $\overline{\text{G}}$ and a third input from the advance or set signal AOS. The NOR element 141 receives a first input from the up-call signal C and a second input from the down-call signal D.

The NOR element 140 receives a first input from the advance-or-set signal AOS, a second input from the down-call signal $\overline{\text{D}}$ and a third input from the car position signal $\overline{\text{B}}$.

During the "set" time if no previously registered down floor call was present during the last scan the NOR element 138 develops a one output to reset the MEMORY element 136.

To illustrate a sequence for generating the signal 78D, assume that down call (D=1) is registered, the scan is below the car ($\overline{G}=0$), the scanner has been advanced (AOS=0), and the car is not at the lower terminal floor ($\overline{B69}=0$) then the signal 78D=1 to indicate a corridor call below the car. If the inputs to the NOR element 140 are all zero, the signal 79D=1 indicates a down call at the floor of the can.

78U, $\overline{\mathbf{78U}}$ (FIG. 4G) are call-above signals for indicating an up or down corridor call above the position of the elevator car or an up corridor call at the position of the car. The logic for generating the signals 78U, $\overline{\mathbf{78U}}$ is generally similar to that employed for the signals 78D, $\overline{\text{78D}}$. Thus, the signals 78U, $\overline{\text{78U}}$ are derived from the two output terminals of a MEMORY element 142. This MEMORY element is set by the lower output of a MEMORY element 143. The MEMORY element 142 is reset by a top signal $\overline{\text{T69}}$ which is dependent on the position of the elevator car at its upper limit of travel, or by the output of a NOR element 144. The NOR element 144 derives a first input from the lower output of the MEMORY element 143 and a second input from the signal $\overline{\text{SET}}$ or $\overline{\text{RESET}}$.

The MEMORY element 143 is set by the output of a NOR element 145 or by that of a NOR element 146. The NOR element 145 derives a first input from the up-call signal $\overline{\text{C}}$, a second input from the car-position signal $\overline{\text{B}}$ and a third input from the advance-or-set signal AOS.

The NOR element 146 receives a first input from the advance-or-set signal AOS, a second input from the scan-above signal $\overline{\text{F}}$, and a third input from the output of the NOR element 141.

The reset terminal of the MEMORY element 143 is reset by the signal RESET which occurs at the completion of a scan period.

Figure 4F:
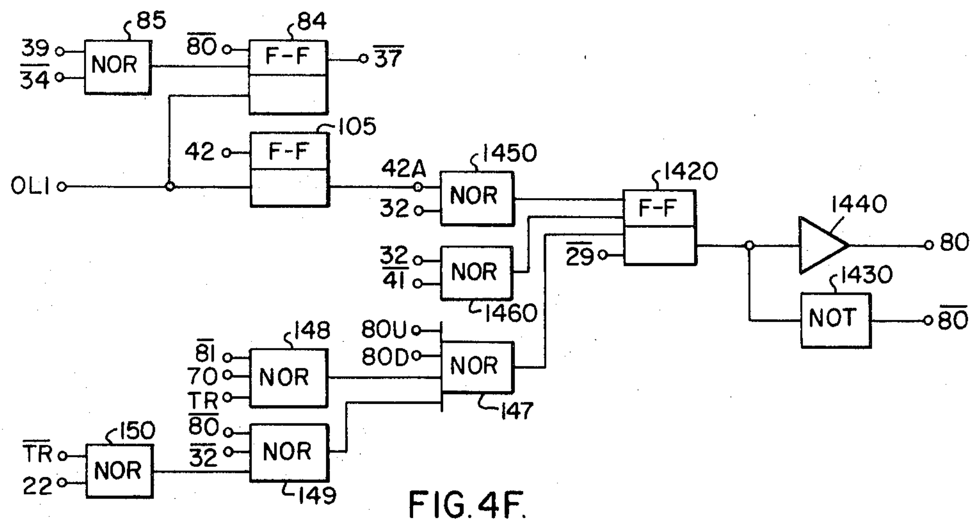
Figure 4G:
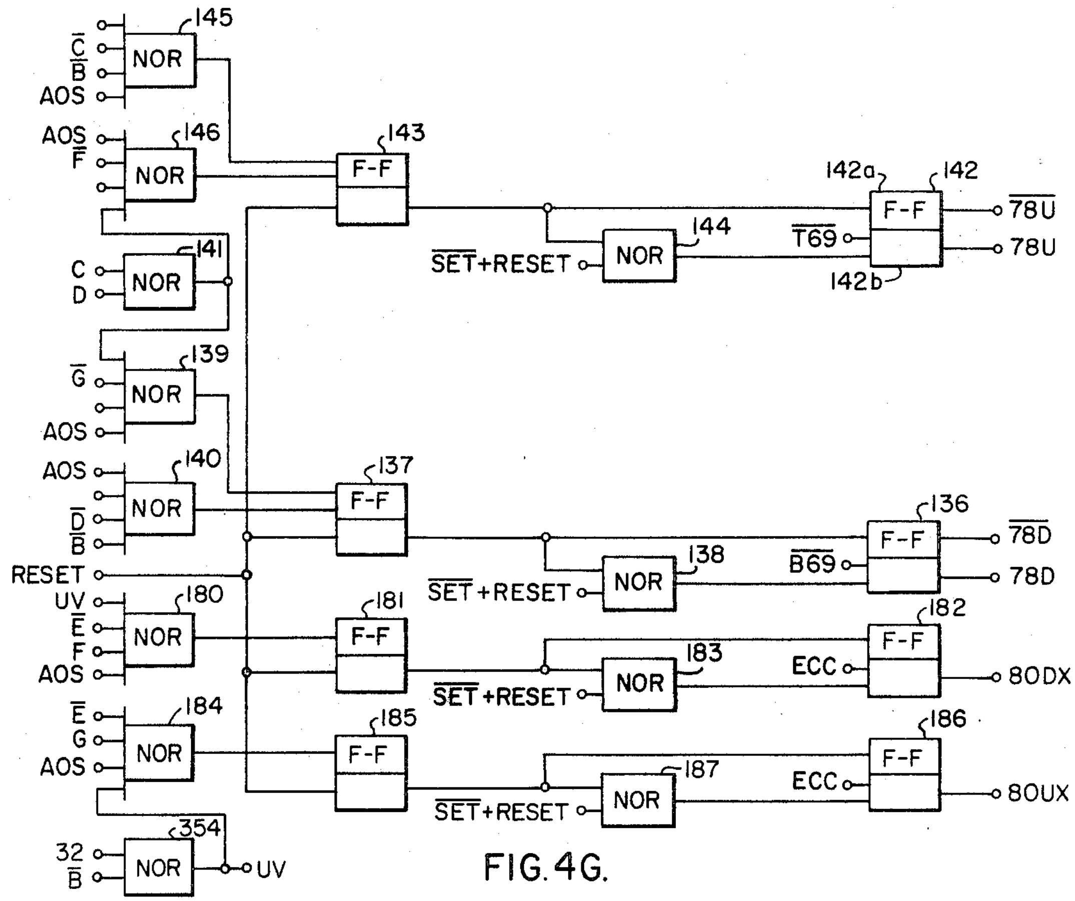
Figure 4H:
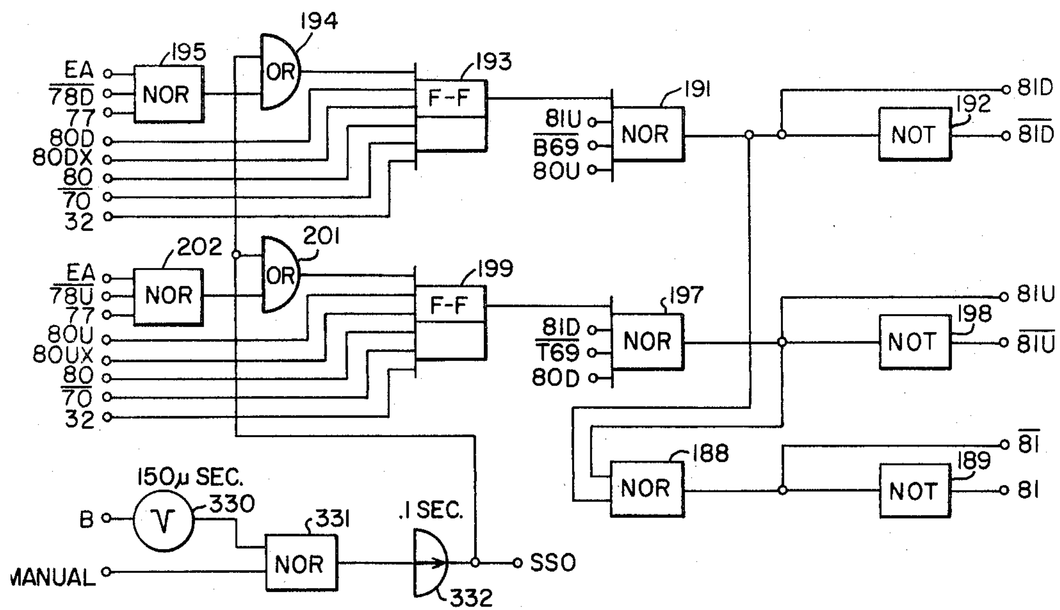
Figure 4I:
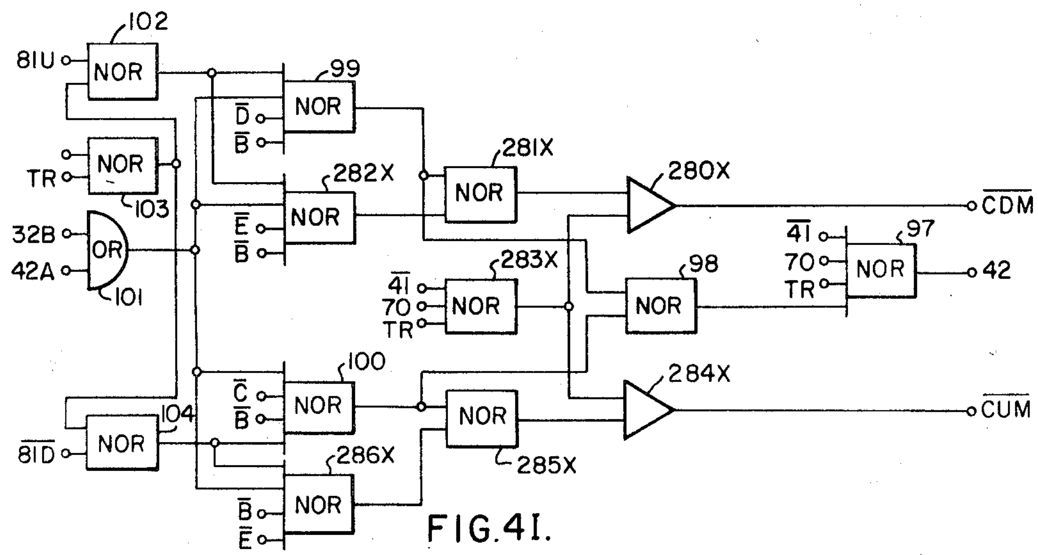
Figure 4J:
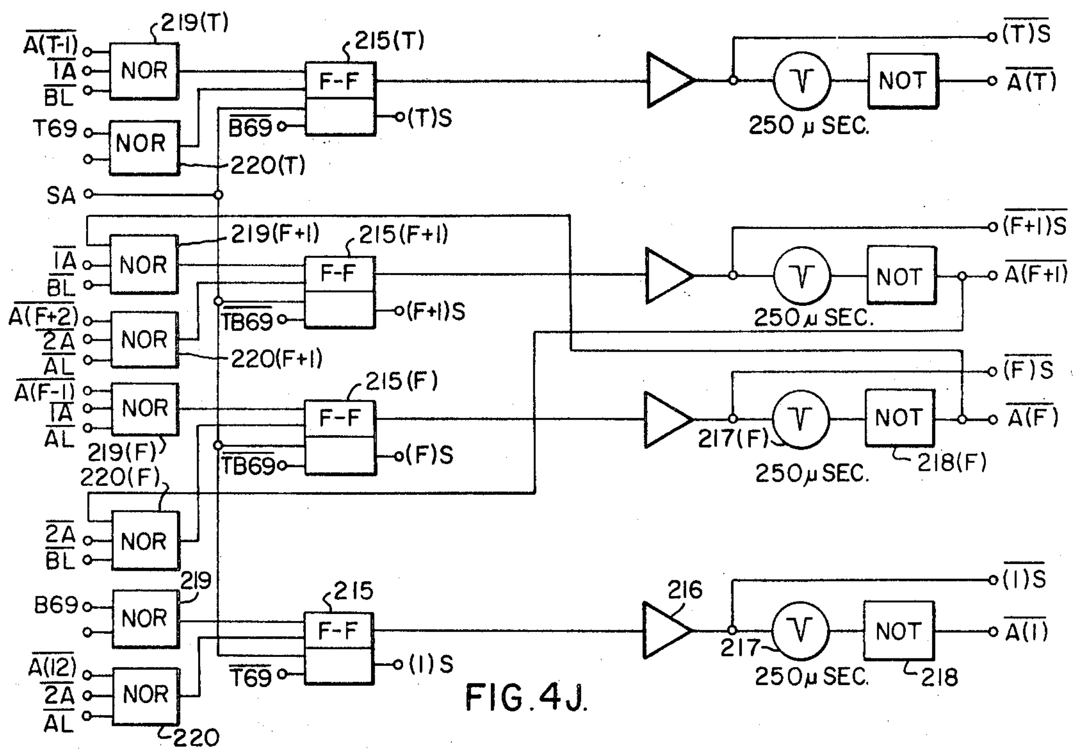
Figure 4K:
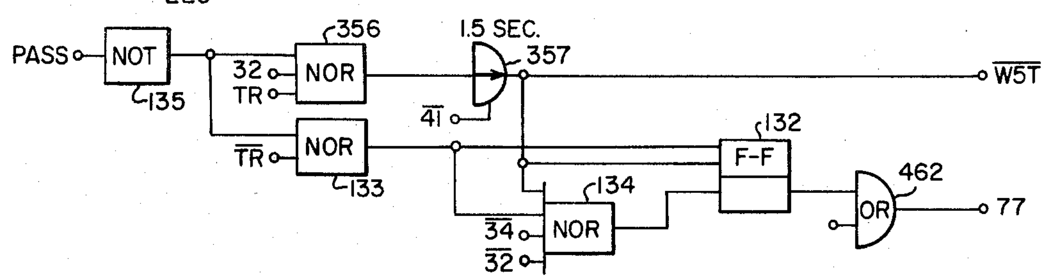
Figure 4L:
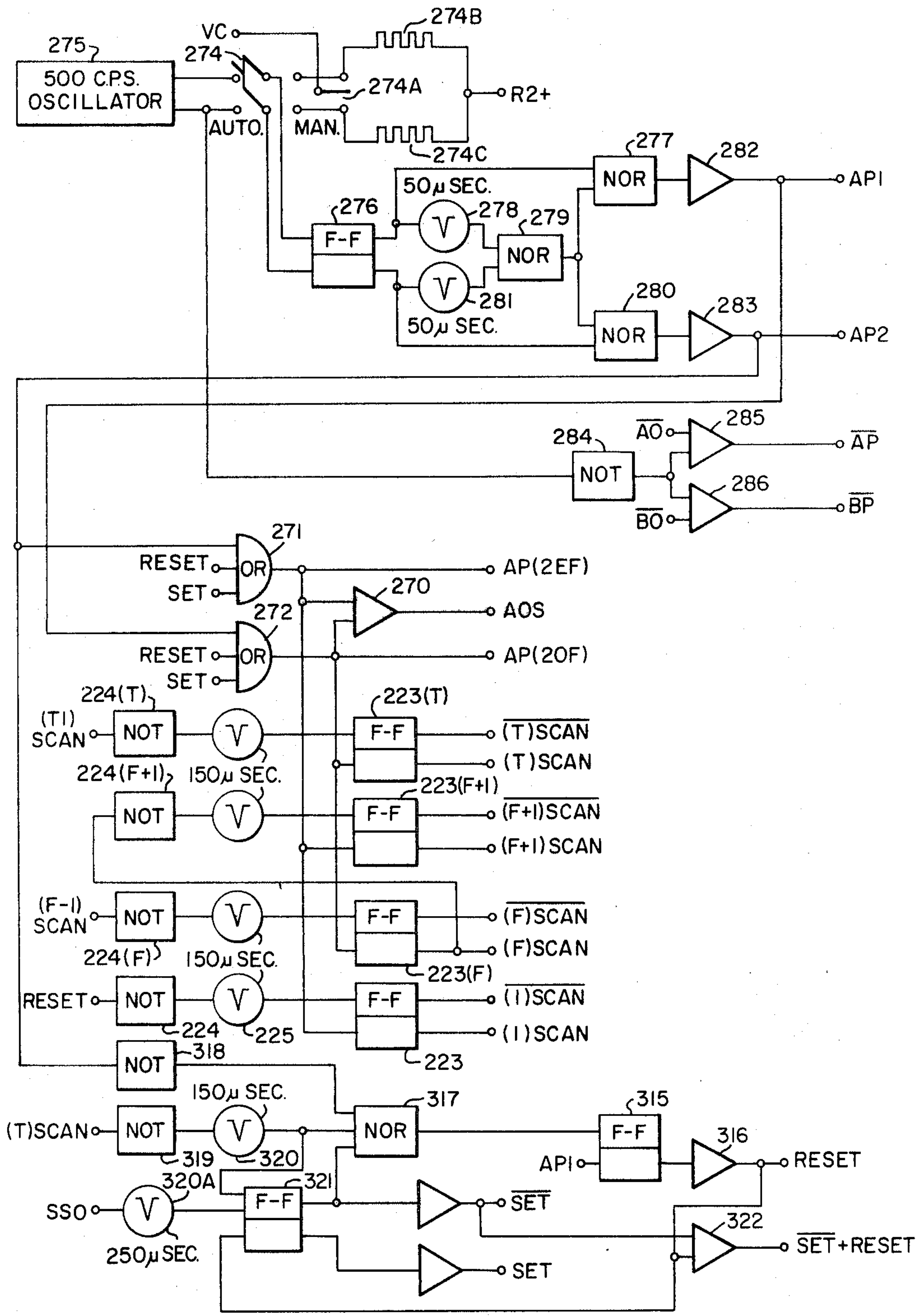

80, $\overline{\mathbf{80}}$ (FIG. 4F). The master-call signal $\overline{\mathbf{80}}$ is derived from the lower output terminal of the MEMORY element 1420 through a NOT element 1430. The same output of the MEMORY element provides a signal 80 through the amplifier 1440.

The MEMORY element 1420 is set by the output of either of the NOR elements 1450 and 1460. The NOR element 1450 receives a first input from the running signal 32 and a second input from the full-open signal 42A. The NOR element 1460 receives a first input from the running signal 32 and a second input from the door-open signal $\overline{\mathbf{41}}$.

The MEMORY element 1420 is reset by the safety signal $\overline{\mathbf{29}}$ or by the output of a NOR element 147. The NOR element 147 receives a first input from the up-attendant signal 80U, a second input from the down-attendant signal 80D, a third input signal from the output of a NOR element 148 and a fourth input signal from the output of a NOR element 149.

The NOR element 148 receives a first input from the motion signal $\overline{81}$ a second input from the auxiliary-non-interference signal 70 and a third input from the transfer signal TR.

The NOR element 149 receives a first input from the master-call signal $\overline{80}$, a second input from the running signal $\overline{32}$, and a third input from the output of the NOR element 150. The latter receives a first input from the door preopen signal 22 and a second input from the transfer signal $\overline{TR}$.

Thus the master-call signal is generated if the car is not running (32=0), the doors are not opening (42A=0) or are closed ($\overline{41}$=0) unless the safety circuit is open ($\overline{29}$=1), the system is an automatic operation (80U=0 80D=0) and no direction is established ($\overline{81}$=1) or the non-interference time has not expired (70=1).

$\overline{A0}$, $\overline{B0}$ (FIG. 4) are introduced at this time to assist in subsequent explanations. These are half-wave phasing signals which are employed for the purpose of reducing materially the amount of wiring required for the system. The phasing signals are derived from a source of alternating current here represented by a power-alternating-current transformer having a secondary winding 153 with its terminals designated AT and BT. The secondary winding has a center tap which goes to common COM. The phasing signal $\overline{AO}$ represents the voltage between the terminal AT and common COM. The circuit may be traced from terminal AT through a low-pass attenuator or filter 154, one input terminal of a NOR element 155, the output terminal of the NOR element and an amplifier 156 to the output terminal for the phasing signal $\overline{AO}$. The ouput of the NOR element 155 also is connected through a NOT element 157 and a pulse-shaping element 158 to a second input of the NOR element 155. As representative of suitable values the voltage AT may have a value of the order of 70 volts RMS at 60 cycles per second. Negative half cycles of this voltage drive the NOR element 155 into saturation and the output of the NOR element 155 is amplified to produce a square wave pulse going from −20 volts to zero for a duration of the order of 8 milliseconds. When the NOR element 155 goes to zero a negative or 1 output is derived from the NOT element 157 which is shaped by the pulse-shaping element 158 to provide a pulse having a duration of the order of 750 microseconds. This provides a positive feedback to make the phasing signal $\overline{AO}$ substantially independent of the loading of the transformer 153.

The phasing voltage $\overline{BO}$ is derived from the voltage from the terminal $\overline{BT}$ to ground in a manner similar to that discused for the phasing signal $\overline{AO}$. Consequently, the phasing signals $\overline{AO}$ and $\overline{BO}$ are displaced in phase from each other by 180°. Components utilized in generating the signal $\overline{BO}$ are identified by the same reference characters utilized for similar components utilized for the signal $\overline{AO}$ with the addition of the suffix A to each.

$\overline{HWR}$ (FIG. 4P) represents a half-wave-reference-notch signal which is useful in assuring proper operation of half-wave control signals. When a signal appears on alternate half cycles it does not provide a continuous command. Thus, the appearance of the signal during one half wave may represent a command to the system but the disappearance of the signal during an alternate half cycle cannot be considered as a disappearance of the command. For this reason, the command preferably is stored and the decision to cancel the command is made only if the command signal fails to appear during the appropriate half cycle.

Due to the leakage and gain of the NOR elements used to generate the phasing signals and to other variables encountered in transmitting the phasing signals through the system the phasing signals may not coincide precisely with the command signals. For this reason, in order to decide whether a command should be cancelled, each half cycle of the command and each corresponding half cycle of the appropriate phasing signal are interrogated during a reference notch or small period of time during which they are certain if present to have proper values. Preferably, this reference notch goes to zero for several hundred microseconds adjacent to the peak value of the half cycle of the sine wave from which the signals are derived.

Such a half-wave-reference-notch may be derived from a circuit which is essentially a full-wave rectifying capacitor input power supply. Thus, the cathodes of two rectifiers 159' and 159 may be connected respectively to the terminals AT and BT through the attenuators 154 and 154A. The anodes of these rectifiers are connected to the anode of a rectifier 160 which has its cathode maintained at a positive biasing potential relative to ground. The anodes of the rectifiers are connected to the emitter of a transistor 161 which is illustrated as of the NPN type. The base of the transistor is connected through a capacitor 162 and a resistor 163 in parallel to the cathode of the rectifier 160. The collector of the transistor supplies the reference notch $\overline{HWR}$ through a NOT element 165 and an amplifier 166. As representative of suitable parameters the capacitor may have a capacitance of 1 microfarad and the resistor may have a resistance of 120,000 ohms.

The capacitor C charges up to the peak value of the voltages derived for the terminals AT and BT on alternate half cycles. As the voltages derived from the terminals AT and BT are positive the transistor base current is cut-off and the capacitor 162 discharges through the resistor 163. As the voltage derived from either of the terminals AT or BT goes more negative than the voltage remaining across the capacitor, collector current flows to generate the half-wave-reference-notch. The illustrated circuit is relatively insensitive to variations in voltage which may be encountered in practice.

Figure 4P:
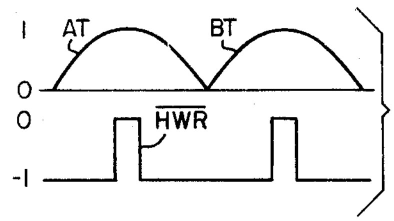
Figure 4Q:
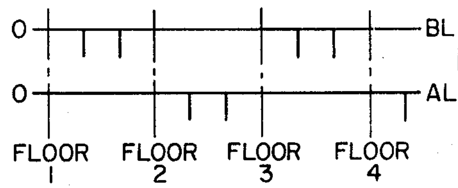

FIG. 4P shows representative curves wherein abscissas represent time and ordinates represent amplitude. The signal $\overline{HWR}$ is shown in relation to two half cycles of the alternating voltages AT and BT.

80U, 80D (FIG. 4) are respectively an up-attendant signal and a down-attendant signal. In order to produce the up-attendant signal 80U the voltage between one terminal AT of the source of alternating current and ground is applied through an up push-button UP and a rectifier 169 across an input of a low-pass attenuator. For an alternating current source having a frequency of 60 cycles per second the low-pass attenuator may be arranged to pass frequencies of the order of 60 to 120 cycles per second. The push-button is biased to open condition and is manually closed for the purpose of producing the up-attendant signal 80U.

The output of the attenuator 170 is applied through a NOT element 171 to one input of a NOR element 172. The second input of the NOR element 172 is supplied by the phasing signal $\overline{AO}$.

If the push-button UP is open the NOT element 171 has a one output and the NOR element 172 consequently has a zero output which is connected to the set terminal of a MEMORY element 173. The lower output of the MEMORY element is connected through an amplifier 174 to supply the up-attendant signal 80U. However, as long as the MEMORY element 173 is in its reset condition the up-attendant signal has zero value.

If the push-button UP is closed pulses having a one value supplied by the NOT element 171 to one input of the NOR element 172. The output is so phased relative to the phasing signal $\overline{AO}$ that they simultaneously present zero inputs to the NOR element 172. This element consequently supplies a one output which is applied to the set terminal of the MEMORY element 173 to produce a one output which is amplified by the amplifier 174 to constitute the up-attendant signal 80U.

In an analogous manner the voltage between the terminal BT of the alternating current source and ground is applied through the push-button DN and a rectifier 175 to the input of the low-pass attenuator 170. The resulting pulses from the NOT element 171 are so phased relative to the phasing signal $\overline{AO}$ that a one input is always present at one of the inputs to the NOR element 172. Consequently, operation of the pushbutton DN cannot supply the up-attendant signal 80U.

The output of the NOT element 171 also supplies one input to a NOR element 176 which has a second input supplied by the phasing signal $\overline{BO}$. The output of the NOR element 176 is connected to the set terminal of a MEMORY element 177 having an output terminal connected through an amplifier 178 to provide the down-attendant signal 80D. The phasing between the pulses derived from the NOT element 171 and the phasing signal $\overline{BO}$ is such that two zero inputs are simultaneously applied to the NOR element 176. Under such circumstances the NOR element applies a one signal to the MEMORY element 177 for the purpose of producing the down-attendant signal 80D.

The MEMORY element 173 is reset by the down-attendant signal 80D, by the transfer signal $\overline{TR}$ or by the output of a NOR element 179. The NOR element 179 has three input terminals and resets the MEMORY element 173 when the output of the NOR element 172, the reference notch signal $\overline{HWR}$ and the phasing signal $\overline{AO}$ are simultaneously zero. In an analogous manner the MEMORY element 177 is reset by the up-attendant signal 80U, the transfer signal $\overline{TR}$ or the output of a NOR element 181 having three inputs. The NOR element 181 resets the MEMORY element 177 when the output of the NOR element 176, the reference notch signal $\overline{HWR}$ and the phasing signal $\overline{BO}$ are simultaneously zero.

80DX (FIG. 4G) is a lower-car-call which indicates the presence of a car call at or below the position of the car. The signal 80DX is controlled in part by a NOR element 180 having four inputs which include an at-floor signal UV which indicates the presence of the elevator car at the scan floor while the car is not running, the car-call signal $\overline{E}$, the scan-above signal F and the advance-or-set signal AOS.

The output of the NOR element 180 is connected to the set terminal of a MEMORY element 181 which has its reset terminal connected to receive the reset signal RESET.

The lower output of the MEMORY element 181 is connected to the set terminal of a MEMORY element 182 which has its lower output terminal connected to provide the lower-car-call signal 80DX.

The MEMORY element 182 is reset by a no-call signal ECC which is maintained until the corridor and car calls are cancelled, or by the output of a NOR element 183. This NOR element receives a first input from the output of the MEMORY element 181 and a second input from the $\overline{SET}$ or RESET signal.

Thus if the car is running or is not at the floor of the scan (UV=0), a car call exists ($\overline{E}$=0), the scan is below the car (F=0), the scan is not changing (AOS=0), the MEMORY element 181 is set and the MEMORY element 182 is set to indicate a car call below (80DX=1). If no car call below the car exists when a scan is completed and $\overline{SET}$ or RESET goes to zero the MEMORY element 182 is reset. When the no-call signal ECC=1 (on emergency service) the MEMORY element 182 also can be reset.

80UX (FIG. 4G) is a higher-car-call signal which indicates the presence of a car call at or above the position of the elevator car. This signal is controlled by four elements 184, 185, 186 and 187 which correspond respectively to the elements 180 to 183 and which are similarly related. The only difference resides in the inputs to the NOR element 184 which comprise a car-call signal $\overline{E}$, the scan-below signal G, the at-floor signal UV and the advance-or-set signal AOS.

81, $\overline{81}$ (FIG. 4H) designate a motion signal. The signal 81 is derived from the output of a NOR element 188 through a NOT element 189. The output of the NOR element 188 also supplies the signal $\overline{81}$. The NOR element has two inputs derived from the up signal 81U and the down signal 81D.

81D, $\overline{81D}$ (FIG. 4H) designate a down signal. The signal $\overline{81D}$ is derived from the output of a NOR element 191 through a NOT element 192. The output of the NOR element also provides the signal 81D. The NOR element 191 receives four inputs, one from the upper output of the MEMORY element 193, one from the up signal 81U, a third from the bottom signal $\overline{B69}$ and a fourth from the up-attendant signal 80U.

The MEMORY element 193 may be set by the lower-car-call signal 80DX, by the down-attendant signal 80D, by the substitute-stop-signal SSO or by the output of a NOR element 195. The signal SSO maintains direction on one floor funs between the terminal floors in the event of scanner or selector failure. The NOR element 195 receives a first input from the emergency hospital signal EA, a second input from the call-below signal $\overline{78D}$ and a third input from the by-pass signal 77.

81U, $\overline{81U}$ (FIG. 4H) designates an up signal generated by a NOR element 197, a NOT element 198, a MEMORY element 199, an OR element 201 and a NOR element 202 which correspond respectively to the elements 191 to 195 previously discussed and which are similarly associated. The only differences are that for the NOR element 202 the call-above signal $\overline{78U}$ replaces the call-below signal $\overline{78D}$, for the MEMORY element 199 the up-attendant signal 80U and the higher-car-call signal 80UX replace the down-attendant signal 80D and the lower-car-call signal 80DX, and for the NOR element 197 the down signal 81D, the top signal $\overline{T69}$ and the down-attendant signal 80D erplace the up signal 81U the bottom signal $\overline{B69}$ and the up-attendant signal 80U.

89T, $\overline{89T}$ (FIG. 4B) designate an MG signal for controlling the motor-generator set. The signal 89T is derived from the output of a NOR element 204 through a delay element 205 and a NOT element 206. The output of the delay element 205 also supplies the signal $\overline{89T}$. A first input for the NOR element 204 is derived from the output of the NOR element 205N having a first input derived from the door-open signal 41 and a second input derived from the leveling signals LU or LD through a NOT element 206N. A second input for the NOR element 204 is derived from the output of a NOR element 207 through a NOT element 208. The NOR element 207 receives a first input from the transfer signal TR, a second input from the auxiliary-non-interference signal 70, a third input from the auxiliary-door-open signal 42 and a fourth input from the motion signal 81.

IBX, TBX (FIG. 4A) are respectively bottom and top hand signals which are employed in hand operation and which are controlled respectively by the car-call push-button units for the bottom and top floors.

A car-call push-button unit is provided for each of the floors. Each unit is identified by the reference character 30 followed by a symbol in parentheses representing the number of the floor. Thus, the reference characters 30(1), 30(2), 30($T-1$) and 30(T) designate car-call push-button units respectively for the first, second, next-to-the-top and top floors. The reference character 30(F) designates a car-call push-button unit for an intermediate floor wherein F represents the number for the floor and the reference character 30 ($F+1$) represents the car-call push-button unit for the next higher floor.

Each car-call push-button unit includes upper contacts and lower contacts both of which are biased to their open conditions. When the car-call push-button unit 30(1) is operated to register a car-call for the first floor its lower contacts close to supply through the push-button TC(B) from the negative bus R2— the signal 1BX. Similarly, when the push-button unit 30(T) is operated to register a call for the top floor one of its sets of contacts closes to supply from the bus R2— through a push-button TC(T) the signal TBX.

1P, 2P, 3P, (FIG. 4C) are position indicator signals which may be employed for actuating position indicators of the type shown in the Savage Pat. 2,728,064. This will be described for a building having nine floors. Floor signals (1)S, (4)S, and (7)S for the first, fourth and seventh floors are connected through an OR element 210 and a NOT element 211 to a first input of a NOR element 212. This NOR element receives a second input from the notch signal 39. The output of the NOR element is connected through an amplifier 213 to a relay 1PR. When the relay 1PR is operated it closes its make contacts 1PR1 to connect appropriate windings of the position indicators POS(1) etc. across the direct-current buses R2+, R2— for the purpose of applying a signal 1P thereto. This signal steps the position indicators to the next floor position. It will be understood that one of the position indicators is located at each of the floors served by the elevator car.

In a similar manner a relay 2PR is associated with floor signals for the second, fifth and eighth floors for the purpose of applying a signal 2P to other windings of the position indicators. A third relay 3PR is similarly associated with floor signals for the third, sixth and ninth floors for the purpose of applying a signal 3P to still other windings of the position indicators. As well understood in the art such signals step the position indicators to indicate at all times the position of the elevator car.

(1)S, $\overline{(1)S}$ . . . (T)S, $\overline{(T)S}$ (FIG. 4J) are floor signals generated by a floor selector for the purpose of showing the position of the elevator car in the hoistway. For each signal the number or letter in parentheses represents the number of the floor of the signal. Thus, the letter (T) represents the top floor and the letter (F) represents one of the intermediate floors.

The floor signal (1)S has a one value when the elevator car is at the first floor and is derived from the lower output of a MEMORY element 215. The floor signal $\overline{(1)S}$ is derived from the upper output of the memory element through an amplifier 216. The amplifier also supplies an auxiliary floor signal $\overline{A(1)}$ for the first floor through a pulse-shaper element 217 and a NOT element 218.

The set terminal of the MEMORY element 215 may be energized by the output of a NOR element 219 or the output of a NOR element 220. The reset terminal of the memory element 215 is energized either by a selector-advance signal SA or by a top signal $\overline{T69}$. The selector-advance signal SA is generated each time the elevator car moves from one to another of the floors. The top signal $\overline{T69}$ is dependent on the positioning of the elevator adjacent the upper-terminal floor.

Only one input for the NOR element 219 is utilized and this receives the signal B69 which is dependent on the location of the elevator car adjacent the bottom-terminal floor.

The NOR element 220 receives a first input from the auxiliary floor signal A(2) which corresponds to the next higher floor, in this case the second floor; a second input from the auxiliary down signal $\overline{2A}$ and a third input from the notch control signal $\overline{AL}$.

A similar set of elements is provided for each of the floors. Each element associated with a floor other than the first floor will be identified by the same reference character employed for the first floor element followed by a suffix in parentheses indicative of the specific floor. In some cases the inputs to the elements differ and these differences now will be considered. The even floors are represented by the floor (F). The NOR element 219(F) receives a first input from the auxiliary floor signal $\overline{A(F-1)}$ for the next lower floor, a second input from the auxiliary-up signal $\overline{1A}$ and a third input from the notch-control signal $\overline{AL}$.

As representative of odd numbered floors the NOR element 219 ($F+1$) derives a first input from the auxiliary floor signal $\overline{A(F)}$ for the floor below, a second input from the auxiliary up signal $\overline{1A}$ and a third input from the notch control signal $\overline{BL}$.

For the top floor the NOR element 219(T) receives a first input from the auxiliary floor signal $\overline{A(T-1)}$ for the floor below, a second input from the auxiliary up signal $\overline{1A}$ and the third input from the notch control $\overline{BL}$ if the top floor is an odd numbered floor or from the notch control signal $\overline{AL}$ if the top floor is an even-numbered floor.

For the top floor a NOR element 220(T) receives only one input, the top signal T69.

It will be recalled that the MEMORY element 215 receives one input to its reset terminal from the top signal $\overline{T69}$. The corresponding input for the top floor is derived fiom the signal $\overline{B69}$ and for the intermediate floors is derived from the top or bottom signal $\overline{TB69}$.

In order to make certain that the floor selector is fully understood a brief operation of the selector will be considered at this time. For the purpose of this operation it will be assumed that the floor (F) is the second floor. It will also be assumed that the elevator car is traveling down and that it has almost reached the first floor.

As the elevator car reaches the first floor the bottom signal B69 goes to zero and the output of the NOR element 219 consequently is changed to a one value. This results in a setting operation of the MEMORY element 215. The floor signal (1)S now has a 1 value to indicate that the elevator car is at the first floor. The auxiliary floor signal $\overline{A(1)}$ also has a one value at this time.

When the elevator car reaches the first floor the bottom signal $\overline{B69}$ and the top-or-bottom signal $\overline{TB69}$ both go to one and reset the MEMORY elements of the intermediate and top floors of the selector to indicate that the car is at none of these floors.

The elevator car now is set for up travel and the auxiliary up signal $\overline{1A}$ has a zero value whereas the auxiliary down signal $\overline{2A}$ has a one value. Consequently, the auxiliary down signal $\overline{2A}$ having a one value prevents the NOR element 220(F) from being effective to set the associated MEMORY element 215(F). Similar comments apply to the other intermediate floors.

As the elevator car moves away from the first floor it generates a notch control signal $\overline{AL}$ for the even floors which has a zero value. In addition, as will be pointed out below a selector advance signal SA having a one value is generated for 50 microseconds and this resets the MEMORY element 215 for the first floor. As a result of this reset the floor signal (1)S is given a zero value and the auxiliary floor signal $\overline{A(1)}$ is given a zero value for 250 microseconds. It will be noted that the auxiliary floor signal $\overline{A(1)}$ provides one of the three input signals for the NOR element 219(F). Since all three inputs are now zero the NOR element 219(F) produces a one output which sets the MEMORY element 215(F) after the signal SA goes to zero. This produces a floor signal (F)S having a one value to indicate that the elevator car is at the second floor and produces an auxiliary floor signal $\overline{A(F)}$ having a one value.

As the elevator car proceeds from the second floor to the third floor it generates a notch control signal $\overline{BL}$ for odd floors having a zero value. It also generates a selector advance signal SA for 50 microseconds which resets the MEMORY element 215(F). This give the floor signal (F)S a zero value to indicate that the elevator car is no longer at the second floor and gives the auxiliary floor signal $\overline{A(F)}$ a zero value for 250 microseconds. The latter forms one of the three inputs for the NOR element 219($F$+1) for the third floor. Since this NOR element now has three zero inputs it produces a one output which sets the MEMORY element 215($F$+1) when the signal SA goes to zero. Consequently the output floor signal ($F$+1)$S$ now has a one value to indicate that the elevator car is at the third floor. The auxiliary floor signal $\overline{A(F+1)}$ has a one value.

This same operation continues for the remaining intermediate floors, if any, until the elevator car reaches the top floor. At this time the top signal $\overline{T69}$ has a zero value and the 1 output of the NOR element 220(T) sets the MEMORY element 215(T) to produce a floor signal (T)S indicating that the elevator car is at the top floor. Also the auxiliary floor signal $\overline{A(T)}$ has a zero value at this time.

Inasmuch as the arrival of the elevator car at the top floor also is accompanied by the production of a top signal $\overline{T69}$ and a top or bottom signal $\overline{TB69}$ having a one value all of the MEMORY elements associated with the lower floors are positively reset.

When the elevator car is set for down travel the auxiliary down signal $\overline{1A}$ has a one value to render the NOR element 219(T) and similar elements for the intermediate floors incapable of setting their associated MEMORIES. At the same time the down signal $\overline{2A}$ has a zero value.

As the elevator car on its down trip approaches the third floor it generates a notch control signal $\overline{AL}$ which for the odd floors or down trips has a zero value. Inasmuch as the auxiliary floor signal $\overline{A(F+2)}$ has a zero value at this time all of the inputs for the NOR element 220 ($F$+1) are zero and the NOR element produces a one output which sets the MEMORY element 215 ($F$+1). This produces a floor signal ($F$+1)$S$ having a one value to indicate that the elevator car is at the third floor and produces an auxiliary floor signal $\overline{A(F+1)}$ having a one value. As this elevator car continues downwardly it generates a notch control signal BL for the even floors on down trips. It also generates a selector advance signal SA of fifty microseconds duration to reset the MEMORY element 215($F$+1). The resultant zero value for the floor signal ($F$+1)$S$ indicates that the elevator car has left the third floor and the auxiliary floor signal $\overline{A(F+1)}$ has a zero for 250 microseconds which is applied the NOR element 220(F). Inasmuch as the NOR element 220(F) now has three inputs of zero value the one output from this NOR element sets the MEMORY element 215(F) to produce a floor signal (F)S having a one value to indicate that the elevator car is at the second floor. At the same time the auxiliary floor signal $\overline{A(F)}$ has a one value. (The elevator car thereafter proceeds to the first floor producing a zero value notch control signal $\overline{AL}$ and producing a one value selector advance signal SA of fifty microseconds duration which resets the MEMORY element 215(F).) The effect of arrival of the car at the first floor has previously been discussed.

(1)SCAN, $\overline{(1)SCAN}$ . . . (T)SCAN, $\overline{(T)SCAN}$ (FIG. 4L) are scan signals which are employed for interrogating successively the status of various signals such as those representing calls for service at each of the floors. The scan signals for the first floor are produced by the output of a MEMORY element 223 which has its set terminal connected for energization from the RESET signal through a NOT element 224 and a pulse-shaper element 225. The MEMORY element is reset by an even-advance-pulse signal AP(2EF) which is applied to MEMORY elements associated with the odd numbered floors. Elements associated with the intermediate floors are identified by the same reference characters followed by a suffix (F) which indicate a specific intermediate floor. The next higher floor is indicated by the expression ($F$+1) and the next lower floor by the expression ($F$−1).

The scanning operation now will be considered briefly with the assumption that the reference character F represents the second floor and that the reference character T represents the fourth floor of a building. Upon receipt of AP1 the RESET signal goes to zero and the MEMORY element 223 is set to indicate that the scan is at the first floor. The scan signal (1)SCAN now has a one value and provides an input for the NOT element 224(F). Upon the occurrence of the next even-advance pulse AP(2EF) the MEMORY element 223 is reset and the input to the NOT element 224(F) goes to zero. As a result, a 150 microsecond pulse is applied to the SET terminal of the MEMORY element 223(F) and the lower output of this MEMORY element now has a one value which indicates a scan at the second floor. In addition, this output is applied to the input of the next higher NOT element 224($F$+1). Upon the occurence of the next odd-advance pulse AP(20F) the MEMORY element 223(F) is reset to indicate completion of the scan at the second floor and the input to the NOT element 224($F$+1) goes to zero. This applies a 150 microsecond pulse to the set terminal of the MEMORY element 223($F$+1) which produces a one output at its lower output terminal to indicate that the scan is now at the third floor. The same output also is connected to the input of the NOT element 224(T) for the fourth floor. Upon the occurrence of the next even-advance pulse AP(2EF) the MEMORY element 223($F$+1) is reset to indicate completion of the scan at the third floor and the input to the NOT element 224(T) consequently goes to zero. This produces a 150 microsecond pulse which sets the MEMORY element 223(T) to indicate that the scan is now at the fourth floor. Upon the occurrence of the next odd advance pulse AP(20F) the MEMORY element 223(T) is reset to indicate completion of the scan at the top floor. As will be pointed out below this eventually results in the generation of a RESET signal for the purpose of starting a new scanning cycle.

10(F), $\overline{10(F)}$ (FIG. 4A) represent a series of up-floor signals one for each floor (F) from which service in the up direction is desired. At each such floor a push-button (F)BU is provided. The expression (F) designates the floor with which the push-button is associated.

20(F), $\overline{20(F)}$ (FIG. 4A) represent a series of down-floor signals one for each floor from which service in the down direction is desired. Each floor (F) is provided with a push-button (F)BD which may be pressed to register a call for down service from such floor.

In order to reduce the amount of wiring most of the push-buttons preferably are arranged in pairs each pair being connected to control elements by a common conductor. Desirably, each pair includes an up push-button and a down push-button for the same floor. Thus, the push-button (F)BU is connected between the conductor AT of the source of alternating current through a rectifier 226(F) and a conductor 227(F) to the input terminal of a low-pass attenuator 228(F). The push-button (F)BD for the same floor is connected between the conductor BT and the low-pass attenuator 228(F) through a rectifier 229(F) and the same conductor 227(F). Inasmuch as the common conductor 227(F) extends from the floor to a distant penthouse or machine room it can be seen that this arrangement saves appreciable wiring. When illuminated call register lamps 230(F) and 231(F) indicate respectivtly that an up or a down call for service is registered. The lamp 230(F) is connected between the conductor BT and the conductor 227(F) through a rectifier 232(F). Lamp 231(F) is connected between the conductor AT and the conductor 227(F) through a rectifier 233(F). Polarities of the rectifiers are clearly shown.

The output of the low-pass attenuator 228(F) is connected through a NOT element 234(F) to one input of each of two NOR elements 235(F) and 236(F). The outputs of these two NOR elements are controlled further by two half-wave phasing signals $\overline{AP}$ and $\overline{BP}$ respectively.

A one output from the NOR element 235(F) sets the MEMORY element 237(F) to register a call for up service. An auxiliary cancel-up signal CU(F) resets the MEMORY element 237(F) to cancel such call. This auxiliary cancel-up signal is derived through an OR element 239U from the output of a NOR element 240(F) which has a first input $\overline{(F)S}$ which is a floor signal indicating the presence of the car at the floor of the call to be cancelled. A second input to the NOR element is derived from the cancel-up signal $\overline{CUM}$ which establishes a condition under which the up floor call is to be cancelled for a car set to stop.

Each car of a bank similarly would provide a cancel-up signal. Thus for the car CB, if employed, a second input for the OR element 239U would be derived from a NOR element (B)240(F) for the car CB which corresponds to the NOR element 240(F) for the car CA.

A one output from the NOR element 236(F) sets the MEMORY element 238(F) to register a down-floor call. This call is cancelled by an auxiliary cancel-down signal CD(F) which is derived through an OR element 239D from the output of a NOR element 242(F). The NOR element derives a first input from the floor signal $\overline{(F)S}$ and a second input from the cancel-down signal $\overline{CDM}$ which indicates when the call is to be cancelled for a car set to stop. If employed, the car CB would have a NOR element (B)242(F), corresponding to the element 242(F) and supplying a second input to the OR element 239D.

When the up push-button (F)BU is pressed half-wave inputs are applied to both of the NOR elements 235(F) and 236(F). These are so related to the phasing signals $\overline{AP}$ and $\overline{BP}$ that the two inputs are simultaneously zero only for the NOR element 235(F) which consequently registers a call for up service by setting the MEMORY element 237(F). In an analogous manner when the push-button (F)BD is pressed the two inputs are simultaneously zero only for the NOR element 236(F) and this results in the setting of the MEMORY element 238(F) to register a call for down service.

The conductor 227(F) is connected to the anodes of two rectifiers 245(F) and 246(F) through the anode and cathode of the silicon-controlled-rectifier SCR(F). The cathodes of these rectifiers 245(F) and 246(F) are connected respectively to the conductors AT and BT.

The gate circuit of the silicon-controlled-rectifier is connected across the secondary winding of a pulse transformer 247(F) which has a resistor 247(F)R connected thereacross. The primary winding of the pulse transformer has a rectifier 247(F)*r* connected thereacross as indicated and is connected across the output of a NOR element 248(F) through a capacitor CAP(F).

The NOR element 248(F) has two inputs. Two of the inputs are supplied by the outputs respectively of two NOR elements 249(F) and 250(F).

The NOR element 249(F) has a first input derived from the up-floor signal $\overline{10(F)}$. It has a second input derived from the phasing signal $\overline{AP}$. A third input is derived from the no-call signal ECC which has a one value until all corridor and car calls are answered. The NOR element 250(F) has a first input derived from the down-floor signal $\overline{20(F)}$ and a second input derived from the phasing signal $\overline{BP}$.

When no floor call is registered for the floor (F) the output of the NOR element 248(F) has a one value and the capacitor CAP(F) is charged to a voltage VC which may be 20 volts. When an up-floor call is registered $(\overline{10(F)}=0)$ and each time the phasing signal $\overline{AP}=0$ the output of the NOR element 248(F) goes to zero and the capacitor CAP(F) discharges through the primary winding of the transformer to generate a string of pulses at the frequency of the oscillator. Thus when an up-floor call is registered the silicon-controlled rectifier SCR(F) is turned on periodically with proper phase to assure illumination of the lamp 230(F). When a down-floor call is registered for the floor (F) the phasing of the silicon-controlled rectifier is such that the lamp 231(F) is illuminated.

30(1), $\overline{30(1)}$ . . . 30(T), $\overline{30(T)}$ (FIG. 4A) are car-call signals which are illustrated for a first floor (1), a second floor (2), another intermediate floor (F) the next higher intermediate floor ($F+1$) a next to the top floor ($T-1$) and a top floor (T). A separate car-call push-button 30(1)B to 30(T)B is provided on the elevator car for each of the floors served. Each of the buttons has an upper set of contacts and a lower set of contacts which are biased to open conditions. In order to reduce the amount of wiring required at least part of the car-call push-buttons are arranged in pairs in the same manner discussed above for the floor car push-button. Thus, the lower set of contacts for the push-button 30(T)B and the upper set of contacts for the push-button 30($T-1$)B are associated with the conductors AT and BT and with phasing signals $\overline{AP}$, $\overline{BP}$ for the purpose of respectively controlling the setting of MEMORY elements 251(T) and 251($T-1$) which generate the car-call signals for the top and next to the top floors. The only differences between these circuits and those discussed above for the floor-call signals reside in the signal provided for resetting the MEMORY elements. Inasmuch as each floor has a single car-call push-button each of the MEMORY elements may be reset by either of the auxiliary cancel-down or auxiliary cancel-up signals. Thus for the MEMORY element 251(T) a one value for either of the signals CU(T) or CD(T) resets the MEMORY element. In addition, each of the MEMORY elements is reset by a no-call signal ECC.

Call-registered lamps are provided for the car-call push-buttons. These are energized in the same manner discussed for the floor-call-registered lamps discussed above. For example, for the top floor a conductor 30CC(T) is connected to complete an energizing circuit for the lamps 252(T) and 252($T-1$) through a silicon-controlled rectifier (not shown) in the same manner discussed for the lamps associated with the floor-call push-buttons as discussed above.

Each of the remaining sets of contacts for the push-buttons of the intermediate floors connects one input of a NOR element 254 through an attenuator 253 to the bus R2— which is negative with respect to ground. The upper set of contacts of the car-call push-button 30(T)B and a push-button TC(T) which is biased to closed condition connect the bus R2— to furnish an input to the NOR element 254 through an attenuator element 255 and to furnish the top hand signal TBX. Similarly, the car-call push-button 30(1)B (lower terminals) and a push-button TC(B) provide an input for the NOR element 254 through the attenuator element 256 and provide a bottom hand signal 1BX. The signals 1BX and TBX pick up relays during hand operation. The output of the NOR element 254 or the running signal 32 or the no-call signal ECC sets a MEMORY element 257, the upper output of which supplies the cut-out signal 300. The MEMORY element 257 is reset by the door-open signal $\overline{41}$. The signal 300 is negated by a NOT element 258 to provide the signal $\overline{300}$.

30(1)X, 30(T)X (FIG. 4) are parking-floor signals which determine whether the elevator car is to park at the bottom or top floors. If the elevator is not on emergency service the switch 260 is closed to connect certain circuits to the conductors AT and BT. If its lower set of contacts is closed the switch 261 selects the bottom floor as the parking floor. If the switch is operated to its second position to close its upper contacts the top floor is selected as the parking floor. If the elevator car is to park the switch 262 is closed. In order to save wiring the signals 30(1)X and 30(T)X are derived from the two sets of contacts of the switch 261 by a half-wave phasing control similar to that employed for deriving the up and down attendant signals 80U and 80D. The MEMORY elements 263 and 264 and the NOR elements 265 and 266 correspond respectively to the elements 173, 177, 179 and 181 associated with the signal 80U and 80D. The resetting of the MEMORY elements 263 and 264 by the associated NOR elements 265 and 266 will be clear from the previous discussion of the resetting operation of the NOR elements 179 and 181. However, the remaining resetting controls for the MEMORY elements 263 and 264 are different.

Both of the MEMORY elements 263 and 264 may be reset by the output of an OR element 267 having a first input derived from the motion signal 81 and a second input derived from the auxiliary-non-interference signal 70. If the elevator car is at the first floor the position signal (1)S resets the MEMORY element 263. If the elevator car is at the top floor the position signal (T)S resets the MEMORY element 264.

AL (FIG. 4B) is a notch-control signal which has previously been discussed.

AO (FIG. 4) is a phasing signal which has been previously discussed.

AOS (FIG. 4L) is an advance-or-set signal which is the output of an amplifier 270 energized either from an OR element 271 or an OR element 272. The OR element 271 has three inputs one from the reset signal RESET, one from the advance pulse AP2 and a third from the set signal SET. The OR element 272 also receives three inputs, one from the set signal SET, one from an advance pulse AP1 and a third from the reset signal RESET.

$\overline{\text{AP}}$, AP1, AP2, $\overline{\text{BP}}$ (FIG. 4L). AP1 and AP2 are advance pulses whereas $\overline{\text{AP}}$ and $\overline{\text{BP}}$ are phasing signals. The derivation of the advance pulses AP1 and AP2 depends in part on the position of a two-pole double-throw switch 274 which has an automatic position AUTO and a manual position MAN. For present purposes it will be assumed that the switch is in its automatic position. In this position the advance pulses are derived from an oscillator 275 having a frequency high enough to perform the desired scanning operation cycle in a time during which the elevator car cannot travel an appreciable distance. As representative of suitable parameters the oscillator may have a frequency of the order of 200 cycles per second or higher. A frequency of 500 cycles per second has been found to be satisfactory and it will be assumed that such a frequency is here employed. The oscillator may be of any suitable type but an oscillator of the multivibrator type is preferred.

The oscillator conveniently generates square wave pulses going from zero to an amplitude −20 volts.

With the switch 274 in its automatic position the output of the oscillator 275 is connected to the set and reset terminals of a MEMORY element 276. The upper output of the MEMORY element 276 supplies an input to a NOR element 277 and another input through a wave-shaping element 278 to a NOR element 279. Similarly, the lower output of the memory element 276 applies an input to a NOR element 280 and another input through a wave-shaping element 281 to the NOR element 279. The wave-shaping elements provide −20 volt pulses having durations of the order of 50 microseconds. The output of the NOR element 279 supplies second inputs to the NOR elements 277 and 280. The outputs of the NOR elements 277 and 280 provide the pulses AP1 and AP2 through the amplifiers 282 and 283.

It will be noted that the pulses AP1 and AP2 are generated alternately. Consequently, if both sets of pulses are employed a combined pulse rate of 1,000 cycles per second is obtained.

An output of the oscillator 275 is applied through a NOT element 284 to first inputs of two amplifiers 285 and 286. These amplifiers may be of the emitter-follower type having two inputs either of which is effective for producing an output from the amplifier. Thus each amplifier acts essentially as an OR element. The NOT element 284 improves the leading and trailing edges of the pulses applied to the amplifiers 285 and 286.

The second input of the amplifier 285 is supplied by the phasing signal $\overline{\text{AO}}$. The second input of the amplifier 286 is supplied by the phasing signal $\overline{\text{BO}}$. Thus when the signal $\overline{\text{AO}}$ has a zero value a series of pulses are provided for the signal $\overline{\text{AP}}$. Similarly, when the phasing signal $\overline{\text{BO}}$ has a zero value a series of pulses are produced for the phasing signal $\overline{\text{BP}}$.

When the switch 274 is in its manual position, pulses may be alternately supplied to the set and reset terminals of the MEMORY element 276 by manual operation of a single-pole, double-throw switch 274A. This is useful during inspection and test procedures.

When the switch 274 is in its manual position the input terminals of the MEMORY element 276 are connected to a terminal R2+ which is maintained positive relative to common through two resistors 274B and 274C respectively. The switch 274A may be operated to connect either of the MEMORY element terminals to a voltage terminal VC which is maintained negative relative to common.

AP(2EF) is the even-advance-pulse signal which is derived from the output of the OR element 271 and which is utilized in advancing the scan from an odd numbered to an even numbered floor.

AP(20F) is derived from the output of the OR element 272 and is an odd-advance-pulse signal which is utilized in advancing the scan from an even to an odd numbered floor.

B, $\overline{\text{B}}$ (FIG. 4N) is a car-position signal indicating the position of the car relative to the scan of the floors for interrogation purposes. Because of the amount of information required at each floor a multi-signal gate-controlled element is employed at each floor and will be referred to as an AND DRIVER. AND DRIVERS 288(1), 288(F), 288($F+1$) and 288(T) are illustrated for the first floor (1), an intermediate floor (F) the next higher intermediate floor ($F+1$) and a top floor (T).

The AND DRIVER 288(1) for the first floor is shown in detail in FIG. 4NA and includes four input terminals for receiving respectively the up floor signal 10(1) the down floor signal 20(1) (assuming a basement floor is located below the first floor), the car-call signal 30(1) and the floor signal (1)S. Each of four output terminals CP(1), DP(1), EP(1) and BP(1) for providing auxiliary up-call, down-call, car-call and car-position signals is connected to its respective input terminal through a rectifier and a resistor which may have a value of 10,000 ohms. The transmission of all of the input signals to all of the output terminals are simultaneously controlled by a gate signal $\overline{\text{(1)SCAN}}$. When the signal $\overline{\text{(1)SCAN}}$ has a one value all of the inputs are blocked from the output terminals. When the scan arrives at the first floor the signal $\overline{\text{(1)SCAN}}$ goes to zero and any signal appearing at any of the input terminals of the AND DRIVER for the first floor appears at the associated output terminal. The gating is effected by connecting each of the input terminals through its associated resistor and a rectifier and a collector-emitter circuit of a common transistor TRA to the common terminal. The transistor is illustrated as an PNP transistor. The base of the transistor is connected to source of voltage VB through a resistor VBR and the signal $\overline{\text{(1)SCAN}}$ is connected to the base through another resistor. All of the outputs BP(1) to BP(T) are connected to an amplifier 290 for the purpose of producing the car-position signal B. The output of the amplifier 290 also operates through the NOT element 291 and an amplifier 292 to provide the car-position signal $\overline{\text{B}}$. The amplifier 292 also receives a second input from the advance-or-set signal AOS.

In a similar manner the outputs ER(1) to EP(T) of the AND DRIVERS are connected through an amplifier 293 to supply the car-call signal E which operates through a NOT element 294 to provide the car-call signal $\overline{E}$. In a similar manner the up-call signal C, $\overline{C}$ and the down-call signal D, $\overline{D}$ are derived from the associated outputs of the AND DRIVERS.

B69, $\overline{B69}$ (FIG. 4B) represent a bottom signal. When the elevator car reaches its bottom terminal it actuates cam-operated contacts DSR to provide through an attenuator 240X and an amplifier 241X the bottom signal $\overline{B69}=1$. This signal operates through a NOT element 242X to provide the bottom signal B69.

$\overline{BP}$ is the phasing signal which was discussed above in connection with the phasing signal $\overline{AP}$.

C, $\overline{C}$ (FIG. 4N) represents the up-call signal which was discussed above in connection with the car-position signal B.

$\overline{CDM}$ (FIG. 4I), cancel down signal, is derived from the output of an emitter-follower amplifier 280X which receives a first input from a NOR element 281X. This NOR element receives a first input from the NOR element 99 and a second input from a NOR element 282X. The NOR element 282X in turn receives a first input from the output of the NOR element 102, a second input from the car-position signal $\overline{B}$ and a third input from the output of the OR element 101. For the cancel down signal $\overline{CDM}$ to be zero, thereby permitting cancellation of the down call for the floor at which the car is located, the output of a NOR element 283X also must be zero. For this output to be zero the car must be on attendant service ($TR=1$), or the doors are open ($\overline{41}=1$) or non-interference time remains ($70=1$).

$\overline{CUM}$ (FIG. 4I) is a cancel-up signal which is generated in a manner similar to that discussed for the signal $\overline{CDM}$. Thus, the signal $\overline{CUM}$ is derived from an amplifier 284X having two inputs. A first input is derived from the output of the NOR element 283X. A second input is derived from the output of a NOR element 285X which receives a first input from the NOR element 100 and second input from the NOR element 286X. The inputs for the NOR element 286X are similar to those for the NOR element 282X.

While the doors are opening the full-open signal $42A=1$ and the cancel down and up signals $\overline{CDM}$ and $\overline{CUM}$ both equal one which are "don't cancel" instructions. When the doors are fully open ($42A=0$) either $\overline{CDM}$ or $\overline{CUM}$ goes to zero to permit cancellation of the appropriate corridor call if present.

D, $\overline{D}$ (FIG. 4N) represent a down-call signal which was discussed in connection with the car position signal B.

E, $\overline{E}$ (FIG. 4N) represent a car-call signal which was discussed in connection with the car-position signal B.

EA, $\overline{EA}$ (FIG. 4) represent a hospital-emergency signal which cancels the car direction and inhibits the response of the elevator car to corridor or floor calls. These signals are produced at the upper and lower outputs of a MEMORY element 299. This will be discussed in conjunction with the by-pass signals PASS, $\overline{PASS}$ which are produced by the two outputs of a MEMORY element 301. These MEMORY elements are arranged for half-wave control in the same manner by which the MEMORY elements 173 and 177 are controlled. The only differences are that the MEMORY elements 299 and 301 are reset only by the outputs of the NOR elements 302 and 303 respectively. These NOR elements correspond to the previously discussed NOR elements 179 and 181. An attenuator 304 corresponds to the attenuator 170 previously discussed. This attenuator is connected to the conductor BT through a rectifier 304A and the upper contacts of the emergency service switch 260. The attenuator also is connected to the conductor AT through a rectifier 304B a by-pass push-button 305 which is biased to open condition and the upper contacts of the operator switch 306. Thus, when the elevator is on operator or attendant service the by-pass button 305 may be manually operated to produce the by-pass signals.

When the elevator is on automatic operation the attenuator 304 is connected to the conductor AT through a rectifier 304C contacts of a load-weighing switch WH and the lower contacts of the operator switch 306. Under such circumstances when the load in the elevator car exceeds a predetermined value such as 80 percent of rated capacity the contacts WH close automatically to produce the by-pass signals.

EB (FIG. 4D) is the emergency-transfer signal produced by the lower output of a MEMORY element 308. The set terminal of the MEMORY element is energized in accordance with the motion signal $\overline{81}$ whereas the reset terminal is energized in accordance with the hospital-emergency signal $\overline{EA}$. When no direction exists the motion signal $\overline{81}$ has a one value and sets the MEMORY value 308 to give the emergency-transfer signal EB a one value. When the elevator is removed from emergency service the hospital emergency signal $\overline{EA}$ has a one value to reset the MEMORY element 308.

ECC (FIG. 4D) is a no-call signal which is derived from the output of a NOR element 308A having as one input the emergency transfer signal EB and as a second input the hospital-emergency signal $\overline{EA}$. When the elevator is transferred to emergency service the no-call signal has a one value until all car-calls have been cancelled and direction exists. Inasmuch as all floor calls are inhibited the car may then be dispatched directly to the desired floor.

F, $\overline{F}$ (FIG. 4N) represents a scan-above signal. The signal F is derived from the output of a NOR element 309 having as a first input a scan-below signal G which indicates that a scan is below the position of the elevator car and as a second input the car-position signal B. Thus if the scan is not at the position of the car ($B=0$) and if the scan is not below the car ($G=0$) the scan-above signal F has a one value. The signal F operates through a NOT element 310 to produce the scan-above signal $\overline{F}$.

G, $\overline{G}$ (FIG. 4N) represent a scan-below signal. These are generated by the lower and upper outputs of a MEMORY element 311. The set terminal of the MEMORY element is energized by the signal RESET whereas a reset terminal is energized by the car-position signal B. Consequently, when the scan is reset to the first floor the MEMORY element 311 is set to produce a scan-below signal G having a one value to indicate that the scan is below the position of the car. When the scan reaches the position of the car the car-position signal B has a one value to reset the MEMORY element 311.

LU or LD (FIG. 4B) represents a leveling signal which has a one value when the elevator car is in its leveling zone assuming that the system includes leveling. This signal was described above in connection with the door preopen signal 22.

OL1 (FIG. 4B) represents an auxiliary-full-open signal which goes to a one when the doors are fully open, and which is derived from the negative bus R2— through a cam-operated switch OLR1 and an attenuator 312. The switch OLR1 is cam operated to close as the elevator car doors reach their fully open position.

PASS, $\overline{PASS}$ (FIG. 4) represent an auxiliary by-pass signal which is discussed above in connection with the hospital-emergency signal $\overline{EA}$.

RCO (FIG. 4) is a manually-controlled or ray-cut-out signal which is paired with the transfer signal TR for half-wave control. These signals are produced respectively by the lower outputs of MEMORY elements 313 and 314. The control of these MEMORY elements is similar to the control provided for the MEMORY elements 299 and 301. The signal RCO is responsive to operation of a push-button RCOB which is biased to its closed condition. The transfer signal TR is controlled by the upper set of contacts of the operator switch 306.

RESET (FIG. 4L) is a reset signal which is derived from the lower output of a MEMORY element 315 through an amplifier 316. The set terminal of this MEMORY element is energized by the output of NOR element 317 while the reset terminal is energized by the advance pulse signal AP1.

The NOR element 317 receives a first input from the advance-pulse signal AP2 through a NOT element 318, a second input from the scan signal (T)SCAN through a NOT element 319 and a wave-shaping element 320, and a third input from the upper output terminal of a MEMORY element 321. The MEMORY element 321 has a first set terminal connected to the output of the wave-shaping element 320 and a second set terminal energized by the scan-or-selector-failure signal SSO through a wave-shaping element 320A to assure scanner start. The reset terminal of the MEMORY element 321 is connected for energization by the reset signal RESET. The upper and lower output terminals of the MEMORY element 321 respectively supply through amplifiers the set signals $\overline{SET}$ and SET. The two signals RESET and $\overline{SET}$ are provided for the two inputs respectively of an emitter-follower amplifier 322 or other suitable amplifier to provide an output signal $\overline{SET}$ or RESET when either of the inputs has a one value.

When the scan reaches the top floor a scan signal (T)SCAN is given a value of one. The next occurrence of an advance pulse AP(2EF), if the top floor is odd numbered, or AP(20F), if the top floor is even numbered, drives the signal (T)SCAN to zero and generates a 150 microsecond pulse which sets the MEMORY element 321. Consequently the signal $\overline{SET}$ now equals zero and the signal SET equals one.

After the setting of the MEMORY element 321 and after the occurrence of the pulse delivered by the shaping element 320 the next advance pulse AP2 produces a zero output of the NOT element 318 and all inputs to the NOR element 317 now being zero the NOR element delivers an output setting the MEMORY element 315 to produce a signal RESET having a one value. This signal is employed in returning the scan to the first floor. The next advance pulse AP1 resets the MEMORY element 315.

S, $\overline{S}$ (FIG. 4E) represent a positive-close signal which is dependent on the time during which the doors are held open. The signal S is derived through a delay element 325 from the upper output $\overline{STEA}$ of a MEMORY element 324. This output has a one value as long as the MEMORY element 324 is reset by a block-beam signal STRB, an auxiliary-block-beam signal $\overline{STA}$ or a reopen signal $\overline{STE}$.

The MEMORY element 324 is placed in set condition by the auxiliary non-interference signal 70, the master-call signal $\overline{80}$, which is an indication that the elevator is to run, or the transfer signal TR which indicates that the system is on attendant operations.

SA, SA1, SA2 (FIG. 4M) are selector-advance signals which are generated by a MEMORY element 327. When the MEMORY element is reset it produces a 50 microsecond pulse or signal SA1. When the MEMORY element is set it produces a 50 microsecond pulse constituting the signal SA2. The presence of either of the pulses SA1 or SA2 produces a pulse SA through a two-input amplifier 328.

The MEMORY element 327 is set by a noutput from either of the NOR elements 90 or 91. If the building has an even number of floors the MEMORY element also is set by the application of the top signal $\overline{T69}$. If the building has an odd number of floors the signal $\overline{T69}$ is employed for resetting the MEMORY element 327. This element also may be reset by the output of either of the NOR elements 92 or 93.

SET, $\overline{SET}$ (FIG. 4L) represent a set signal which was discussed in connection with the RESET signal.

SSO (FIG. 4H) represents a scan-or-selector failure signal which is derived from the car-position signal B through a wave-shaping element 330 a NOR element 331 and a delay element 332. The NOR element also has provision for receiving a manually-controlled input. This input prevents the generation of a scan-or-selector-failure signal SSO during certain trouble shooting operations. When the system is on automatic operation the car-position signal B supplies a 150 microsecond pulse to the NOR element 331 during each scan and the delay element cannot time out to provide a signal SSO having a one value. However, if the selector loses the car, or if the scanner circuit fails, the timer will time out to generate a signal SSO having a one value. This signal is utilized in controlling the up signal 81U, the down signal 81D and the auxiliary-stop signal 34X to cause the car to run from one to the other of the terminal floors with a stop at each floor.

STA, $\overline{STA}$ (FIG. 4*B*) represent an auxiliary-block-beam signal. It is derived from the light signal STR which has a one value as long as a light beam or ray extends uninterrupted across the doorway of the elevator car. This signal STR is applied to a delay element 335 which in turn supplies the auxiliary-block-beam signal STA to the input of a NOT element. The output of the NOT element generates the auxiliary-block-beam signal $\overline{STA}$. If the light beam is blocked for a predetermined time such as 0.9 second the signal $\overline{STA}$ goes to a one value.

STE, $\overline{STE}$ (FIG. 4B) represents a door-reopen signal. The signal STE is derived from a NOR element 337, and through a NOT element 338 it provides the related signal $\overline{STE}$. The NOR element 337 has two inputs derived respectively from the outputs of two NOR elements 339 and 340. The NOR element 339 receives a first input from the running signal 32 a second input from the positive-close signal S and a third input $\overline{DO}$ from the negative bus R2— through a door-open push-button 341 (located in the car) and an attenuator 342. Consequently, if the elevator car is not running (32=0), if it is not subject to positive door closure (S=0) and if the door-open push-button 341 is manually opened ($\overline{DO}$=0) the NOR element 339 has a one output which in turn assures a reopen signal STE having a zero value.

It is conventional practice to provide the leading edge of an elevator car door with a safety edge which operates a safety-edge switch SSE. This switch is closed as long as no person is in the closing path of the door. However, if the safety edge encounters a person in the closing path of the door it operates the switch SSE to open condition.

The NOR element 340 receives a first input $\overline{SS}$ from the negative bus R2— through the safety-edge switch SSE and an attenuator 343. It receives a second input from the transfer signal TR and a third input from the door preopen signal 22. Consequently, if the elevator car is on automatic operation (TR=0), its doors are not closed (22=0) and the safety-edge switch SEE is operated to its open condition ($\overline{SS}$=0). The NOR element 340 has a one output which in turn assures a zero value signal STE.

STR, $\overline{STR}$ (FIG. 4B) represents a light signal. When a light beam is directed across a doorway for the purpose of controlling the car doors it is conventional practice to employ a relay having contacts STRR which are closed when the light beam extends across the doorway and which are open when the light beam is interrupted. When these contacts are closed they connect the negative bus R2— through an attenuator 333 to provide the signal STR. This signal through a NOT element 334 supplies the light signal $\overline{STR}$.

STRB, $\overline{STRB}$ (FIG. 4E) represent an interrupted-beam signal. The signal STRB is derived from the upper output terminal of a MEMORY element 345, and through a NOT element 346 provides the signal $\overline{STRB}$. It indicates that the light beam has been interrupted.

The set terminal of the MEMORY element 345 is connected to be energized from the door-open signal $\overline{41}$ through a one-shot multi-vibrator 347. The brief output of the one-shot multi-vibrator prevents generation of the signal STRB during the initial opening operation. This prevents a false generation of the signal STRB during the period when the doors are first opened $(\overline{STR}=1)$ and the lamp generating the light beam is building up to its full intensity. The MEMORY element 345 also is set by the output of the NOR element 348 which has two inputs derived from the light signal $\overline{STR}$ and the auxiliary non-interference signal 70. Thus, the MEMORY element 345 is set if the light beam is not interrupted $(\overline{STR}=0)$ and if the non-interference time has timed out (70=0). The MEMORY element 345 also is set if the door-open signal indicates that the door is in its closed condition (41=1).

If the light beam across the doorway is interrupted $(\overline{STR}=1)$ the MEMORY element 345 is reset (STRB=1)

T69, $\overline{T69}$, $\overline{TB69}$ (FIG. 4B) represents signals dependent on car position. The top signal $\overline{T69}$ is derived from the output of an amplifier 350 and produces a top signal T69 through a NOT element 351. The input for the amplifier is derived from the negative bus R2— through contacts of a switch USR which is cam operated to close as the elevator car reaches the top floor and through an attenuator 352. The top signal $\overline{T69}$ and the bottom signal $\overline{B69}$ provide inputs for an amplifier 353 which produces an output $\overline{TB69}$ which has a one value when the elevator car is at either the top or bottom floor.

TR (FIG. 4) is a transfer signal having a one value when the system is placed on attendant operation. The derivation of this signal is discussed above in connection with the signal RCO.

UV (FIG. 4G) is an at-floor signal derived from the output of a NOR element 354. When the elevtaor car is not running (32=0) and is at a floor being scanned $(\overline{B}=0)$ the signal UV has a one value.

$\overline{W5T}$ (FIG. 4K) is an auxiliary-time signal which is derived from the output of a NOR element 356 through a delay element 357. The delay element is reset by the door-open signal $\overline{41}$.

If a by-pass signal is generated the input to the NOR element 356 from the NOT element 135 is zero. If at the same time the car is not running (32=0) and the system is on automatic operation (TR=0) the NOR element 356 develops a one output which is delayed for say 1½ seconds to produce the auxiliary-time signal $\overline{W5T}$ having a one value.

$\overline{A(1)}$ . . . $\overline{A(T)}$ (FIG. 4J) are auxiliary floor signals derived from the floor selector. The derivation of these signals is discussed in connection with the derivation of the signals (1)S etc.

CD(F) (FIG. 4A) is an auxiliary-cancel-down signal provided for each floor (F). It is employed in cancelling registered calls for service and is discussed in connection with the discussion of the signals 20(F).

CU(F) (FIG. 4A) is an auxiliary-cancel -up signal provided for each of the floors (F) and is described in connection with the description of the production of the signals 10(F).

In some cases the controller may require signals capable of delivering substantial energy. In such cases the signals may be amplified by suitable amplifiers either of the solid state type or of the electromechanical relay type. For illustrative purposes a number of relay amplifiers now will be considered.

When the elevator car is to go up a go-up relay GU (FIG. 4C) is energized and picked up by connecting the winding of the relay across the buses R2— and R2+ through make contakes GUA1 of an auxiliary go-up relay GUA, a switch 60–2 which is closed when the elevator system is on automatic control and break contacts GD2 of a go-down relay GD.

The relay GU also may be picked up by the signal TBX through the contacts GD2 when the elevator system is on hand control (switch 60–1 is closed).

When the elevator car is to start (master-call signal $\overline{80}$=0) in the up direction (up signal $\overline{81U}$=0) a NOR element 360 supplies an input through an amplifier 361 to the auxiliary go-up relay GUA which has one terminal connected to the positive bus R2+.

When the elevator car is to start down a go-down relay GD is connected across the buses R2— and R2+ through make contacts GDA1 of an auxiliary go-down relay GDA, a switch 60–4 which is closed when the elevator system is on automatic operation and break contacts GU2 of the go-up relay GU. The go-down relay also may be energized by the signal 1BX through a switch 60–3 which is closed when the elevator system is on hand control and through the break contacts GU2.

When the elevator car is to start in the down direction (master-call signal $\overline{80}$=0 and down signal $\overline{81D}$=0) the output of a NOR element 362 supplies energy to the auxiliary go-down relay GDA through an amplifier 363.

In order to stop the elevator car a stop relay 34KR is energized through make contacts of an auxiliary stop relay 34A1. The auxiliary stop relay is energized by the stop signal 34 through an amplifier 364.

It will be assumed that the elevator car is moved by a traction motor of a direct-current type which is energized from a motor-generator (MG) set in a system which is conventionally known as a Ward-Leonard or variable-voltage system. The motor of the motor-generator set is started by an MG relay 5 which is energized through make contacts MGA1 of an auxiliary MG relay MGA, a switch 60–6 which is closed when the system is on automatic operation, a switch MG which is closed when the elevator system is in service. The auxiliary MGA relay is energized by the MG signal 89T through an amplifier 365.

In order to close the elevator doors a door-close relay 43R is energized by the close-door signal 43 through an amplifier 366. To open the doors a door open relay 44R is deenergized by the open-door signal $\overline{44}$ through an amplifier 367.

OPERATION

Circuits for generating a number of individual signals have been described above. Outlines of a few typical overall operations of the system now will be presented. It will be assumed initially that the elevator car CA is at the first floor (B69=0, $\overline{B69}$=1, 1S=1, $\overline{1S}$=0, its doors are closed, the elevator car is in service, its motor-generator set is shut down and its scanner is in operation to generate rapidly and repetitively the signals (1)SCAN to (T)SCAN. At this point an intending passenger at the second floor presses the push-button (2)BU thus signifying his desire for elevator service in the up direction. As a result of this push-button operation the up floor signal 10(2)=1, $\overline{10(2)}$=0 and the call-registered map 230(2) is illuminated.

As the push-button is operated it will be assumed that the scanner is at the first floor $\overline{(1)SCAN}$=0) and that the gate of the AND DRIVER 288(1) is open. The car-position signal (B=1, $\overline{B}$=0) indicates that the elevator car is at the first floor. Inasmuch as no call for service is registered for the first floor the opening of this gate has no other effect at this time on the operation of the system.

Upon receipt of the signal AP(2EF) the scanner now operates to its next condition for the purpose of interrogating conditions for the second floor $\overline{(F)SCAN}$=1, (F)SCAN=0 and the gate of the AND DRIVER 288(2) for the second floor now is open. Under these circumstances the scan is above the position of the car (F=1, F=0), an up call is indicated (C=1, $\overline{C}$=0) and a call above the position of the car in indicated (78U=1, $\overline{78U}$=0). The presence of the call above the car sets the system for up travel (81U=1, $\overline{81U}$=0) and calls for movement by the car (81=1, $\overline{81}$=0). A master-call signal also is indicated at this time (80=1, $\overline{80}$=0).

In the presence of the motion signal (81=1) the MG signal 89T picks up the auxiliary MG relay MGA and this in turn picks up the MG relay 5 to start the MG set.

The master-call signal $\overline{80}$ and the up signal $\overline{81U}$ both being zero, the auxiliary go-up relay GUA picks up and closes its contacts GUA1 to pick up the go-up relay GU. The car now starts up from the first floor. As the car leaves the first floor the notch-control signal $\overline{AL}$ goes to zero and inasmuch as the up signal $\overline{1A}$ also is zero the selector-advance signals SA and SA2 both go to 1. This advances the floor selector and as a result of the advance (1)S=0, $\overline{(1)S}$=1, (2)S=1 and $\overline{(2)S}$=0.

When the scanner next opens the gate of the AND DRIVER element 288(2) the auxiliary up signal $\overline{1A}$, the car-position signal $\overline{B}$ and the up-call signal $\overline{C}$ are all zero and the auxiliary-stop signal 34XA goes to a one value. As a result, the auxiliary-stop signal 34X equals zero and the stop signal 34 is generated to pick up the auxiliary stop relay 34A. This relay closes its make contacts 34A1 to pick up the stop relay 34KR. This stops the elevator car at the second floor.

As the car stops (32B=0) and the doors open (42A=0) the cancel-up signal $\overline{CUM}$ becomes zero. Since the floor signal $\overline{(2)S}$ also is zero an auxiliary-cancel-up signal CU(2) is generated which cancels the up call at the second floor.

When the stop relay 34KR opens its contacts 34KR1 it places the contactors 1 and 2 and the running relay 32 under the control of the switch 17. The switch 17 opens at the proper time to stop the elevator car accurately at the second floor. When it opens, the switch 17 deenergizes the up contractor 1 and the running relay 32. The up contractor opens its make contacts 1–1 and 1–2 to deenergize the field winding GE2 and opens its make contacts 1–3 to apply the brake 15. As a result of the opening of the make contacts 1–8 of the up contactor, running signal 32=0 and $\overline{32}$=1. This causes the door-master signal 45 to go to zero and this in turn produces an open-door signal $\overline{44}$ having a zero value. The open-door signal $\overline{44}$ drops out the open-door relay 44R which closes its break contacts 44R1 to pick up the door-open relay OP. The relay OP closes its make contacts OP1 and OP2 to energize the door motor 31 properly for the purpose of opening the doors. When the doors reach fully-open position they open contacts OLR2 to deenergize the door-open relay OP and close contacts OLR1 for the purpose of generating the auxiliary-full-open signal OL1.

The signal OL1 starts a timing out operation of the delay element 130D. The delay element controls the non-interference signals 70T, $\overline{70T}$. The call-above signal 78U, the up signal 81U and the motion signal 81 all go to zero and the MG signal 89T starts to time out. However, the delay for the MG signal has a substantial value such as two minutes.

It will be assumed next that the intending passenger at the second floor enters the car promptly and presses the push-button 30(T)B for the top floor. As a result, 30(T)=1, $\overline{30(T)}$=0 and the lamp 252(T) is illuminated. The registration of a car call causes the cut-out signal $\overline{300}$ to go to zero and if the doors are open (42=0) any remaining non-interference time is cut out (70=0).

When the auxiliary non-interference signal 70 goes to zero the door-master signal $\overline{(45}$=0) generates a close-door signal 43 to pick up the auxiliary-close-door relay 43R which closes its make contacts 43R1 to energize the door-close relay CL. The resulting closure of the make contacts CL1 and CL2 energizes the door motor 31 properly to close the doors. Completion of the door closing movement opens the contacts CLR2 to deenergize the door-close relay CL and completes the circuit which generates a door-open signal (41=1).

Inasmuch as all of the doors are now assumed to be closed the relay 29R picks up to close its make contacts 29R1 to prepare certain starting circuits for subsequent operation and closes its make contacts 29R3 which controls the generation of the safety signal 29, $\overline{29}$.

When the scan reaches the AND DRIVER element 288(T) for the top floor $\overline{(T)SCAN}$=0 the gate for this element is opened and inasmuch as a car call is registered for the top floor (30($T$)=1) this condition is represented by the car-call signal ($E$=1, $\overline{E}$=0). Also the scan is located above the position of the elevator car ($F$=1, $\overline{F}$=0, $G$=0). The higher-car-call signal 80UX now has a one value. The system now is conditioned for up travel (81U=$\overline{181U}$=0) and motion of the elevator car is called for (81=1, $\overline{81}$=0). The motion signal (81=1) terminates the timing out operation of the MG signal 89T and the MG set continues to run.

As the consequence of the closure of the doors $\overline{41}$=0 the master-call signal $\overline{80}$ goes to zero and since the up-signal $\overline{81U}$=0 the auxiliary go-up relay GUA picks up to pick up the go-up relay GU. The elevator car now starts upwardly.

As the car moves up the floor selector steps until it finally reaches the top floor ($\overline{A(T)}$=1, ($T$)$S$=1), and when the scanner next reaches the top floor.

$$(\overline{(T)SCAN}=0$$

to open the gate of the AND DRIVER element 288(T), the signals $\overline{E}$, $\overline{B}$, and $\overline{32}$ are all zero. Under these circumstances the auxiliary-stop signal 34XB=1, the auxiliary-stop signal $\overline{34X}$=0 and the stop signal 34=1. Consequently the auxiliary stop relay 34A closes its contacts 34A1 to pick up the stop relay 34KR and the car comes to a stop at the top floor. The doors open to permit discharge of a passenger and reclose in the manner previously described.

It will now be assumed that an intending passenger at the first floor presses the push-button (1)BU. As a result 10(1)=1, $\overline{10(1)}$=0 and the lamp 230(1) illuminates to indicate registration of the call. When the scanner reaches the first floor the presence of an up call is indicated (C=1) and the scan is located below the car (G=1). Inasmuch as C=1 and $\overline{G}$=0, when the advance-or-set signal AOS goes to zero the call below is indicated (78D=1, $\overline{78D}$=0). The call-below signal ($\overline{78D}$=0) sets the system for down travel (81D=1, $\overline{81D}$=0) and movement of the elevator car is called for (81=1, $\overline{81}$=0). This is assumed to occur before the time delay element 205 times out and the motor-generator set consequently continues to run.

Inasmuch as the signals $\overline{81D}$ and $\overline{81}$ are both zero the auxiliary go down relay GDA closes its contacts GDA1 to pick up the go down relay GD. When the elevator car reaches the first floor ((1)S=1) the auxiliary stop signal 34XC goes to one, the signal $\overline{34X}$ goes to zero and the stop signal 34 goes to one. This stops the elevator car at the first floor and opens the doors by sequences which will be clear from the preceding discussion. The intending passenger now enters the car and registers a car call for the floor to which he desires to proceed.

ADVANCE INTERROGATION OF REGISTERED CALLS

In the system thus far described in detail it has been assumed that the slow down and stopping distance of the elevator car is so short that only a small lead in interrogation of registered calls for service is required. However, in some systems, particularly those in which the elevator cars operate at relatively high speed, it is desirable that a decision to stop the elevator car be made one or more floors i nadvance of the arrival of the elevator car at the floor at which it is to stop. For illustrative purposes it will be assumed that the decision is to be made when the elevator car is one floor in advance of the floor at which it is to stop.

Figure 5:
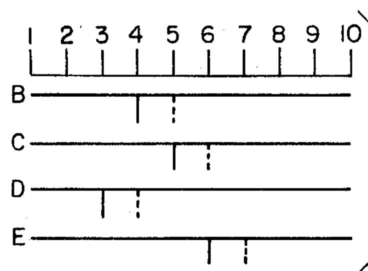

In FIG. 5 abscissas represent the positions of the scan in a building served by the elevator car. The building is assumed to have ten floors. Ordinates represent amplitudes of signals.

It is assumed that the elevator car is at the fourth floor (B=1, shown as a full-line pulse at the fourth floor position), an up floor call is registered for the fifth floor (C=1 in the fifth floor position), a down floor call is registered for the third floor (D=1 for the third floor position) and a car call is registered for the sixth floor (E=1 for the sixth floor position).

In the system thus far described in detail, when the elevator car floor selector notches to its fifth floor condition and the scanner arrives at such floor the signals B=1 and C=1 are produced and a decision is made to stop the elevator car at the fifth floor. In order to make a decision to stop the elevator car at a floor well before the car reaches such floor the generation of a pulse B for a floor is delayed and is actually generated when the scan has advanced past the floor designated by the pulse by a distance corresponding to one or more floors depending upon the amount of advance or lead desired.

For present purposes it will be assumed that a one floor advance is desired. Under the assumed conditions when the scan reaches the fourth floor a pulse B is initiated but does not actually appear until the scan reaches a fifth floor position as shown by the dotted pulse. As a result, when the elevator car in traveling up reaches a fourth floor position the delayed pulse B appears as the scanner opens the gate for the AND DRIVER 288(5) (FIG. 4N) for the fifth floor. Inasmuch as the signals $\overline{1A}$, $\overline{B}$ and $\overline{C}$ are all zero at this instant a decision is made to stop the elevator car for the up call at the fifth floor while the car is still adjacent the fourth floor.

The desired delay may be built into the amplifier element 290. To illustrate a desirable construction providing such delay it will be assumed that the amplifier element 290 is replaced by the element 400 shown in FIG. 6.

In FIG. 6 the input signal BP provides the desired output signal B through either of two channels. In the first channel the signal BP is applied to the input of an amplifier 401 which has its output connected to the input of a wave-shaper element 402. The first path then may be traced through a NOT element 403, a NOR element 404 and an OR element 405 to the output terminal providing the signal B. A second path includes a MEMORY element 406 having its set terminal connected to the output of the wave-shaper element 402 and having its upper output connected through a wave-shaper element 407 and the OR element 405 to provide the signal B. The reset terminal of the MEMORY element 406 is energized by the advance-or-set signal AOS.

The effectiveness of the two paths is controlled by a signal applied to a conductor 408. This conductor applies a second input to the NOR element 404 through an attenuator element 409 and applies a second input to the SET terminal of the MEMORY element 406 through the attenuator element 409 and a NOT element 410.

As long as a signal having a zero value is applied to the conductor 408 the MEMORY element 406 is maintained in SET condition and consequently is ineffective for generating the signal B. However, the first path is effective for generating the signal B without introducing any delay.

As long as a signal having a one value is applied to the conductor 408 the second input to the NOR element 404 has a one value and this NOR element thus renders the first path ineffective for generating the signal B. However, a pulse applied by the wave-shaper element 402 to the SET terminal of the MEMORY element 406 sets the MEMORY element and thus provides a zero input for the wave-shaper element 407. When the next advance or set pulse occurs the MEMORY 406 is reset and a pulse B consequently is generated. Because of the spacing between successive advance pulses a delay corresponding to a one floor delay in scan is introduced between each car-position signal B pulse and the pulse supplied by the wave-shaper element 402 which generates the signal B pulse.

During down travel of the elevator car a corresponding system for detecting floors at which the elevator car is to stop may be provided wherein the scan or interrogation of the floor proceeds from the up floor downwardly and wherein the car-position signal B is delayed to provide advance detection of each floor at which the elevator car is to stop. However, it will be assumed that the same scanner is employed for detecting floors at which the elevator car is to stop during both up travel and down travel of the elevator car.

When the element 400 is employed as the amplifier element 290, the conductor 408 is connected to have a signal having a one value applied thereto during up travel of the elevator car and a zero value during down travel of the elevator car. As shown in FIG. 6 the conductor 408 may be connected for energization by the up signal 81U.

When advance detection of floors at which the elevator car is to stop during down travel is desired each of the amplifiers 233, 233D and 233C may be similar to the element 400 of FIG. 6. However, the input to the conductor 408 is given a one value during down travel of the elevator car and a zero value during up travel of the elevator car. To this end the conductor 408 may be energized by the down signal 81D. Under these circumstances during down travel of the elevator car the car position pulses occur without delay as represented by the full line pulse in FIG. 5 whereas the up-call signal C, the down-call signal D and the car-call signal E are delayed by a distance corresponding to one floor as represented by dotted line pulses in FIG. 5.

Let it be assumed that the elevator car is leaving the tenth floor on a down trip and that a car call is registered for the sixth floor. Because of the delay in the car-call signal E the system sees the car call for the sixth floor as though it were made for the seventh floor. Consequently, as the car approaches the seventh floor the car-position signal $\overline{B}$ for the seventh floor is generated without delay and cooperates with the delayed car-call signal E to generate an auxiliary-stop signal (34XB=1) for the purpose of stopping the elevator car at the sixth floor. Thus, a one floor lead is provided in the instructions to stop the elevator car. In a similar manner a one floor lead is provided if the elevator car on a down trip is to stop for an up-call signal C or a down-call signal D.

MULTIPLE CAR BANK CORRIDOR CALL ASSIGNMENT

The following discussion is directed to a system wherein two or more elevator cars are arranged in a bank. For present purposes it will be assumed that the bank includes only two elevator cars CA and CB. A component associated with the elevator car CB which is similar to a component associated with the elevator car CA will be identified by the same reference character followed by the suffix (B).

The same signals AP1, AP2, AOS, SET, $\overline{\text{SET}}$, RESET, 10(F), $\overline{\textbf{10}\text{(F)}}$, 20(F), $\overline{\textbf{20}\text{(F)}}$ and (1)SCAN, $\overline{\text{(1)SCAN}}$ to (T)SCAN, $\overline{\text{(T)SCAN}}$, may be employed for all cars in the bank.

As applied to banks the pulse system herein described lends itself to certain arrangements which materially improve the efficiency in operation of the banks. Efficiency may be improved by preassigning certain of the calls for service to a specific elevator car. Thus, if a corridor call is registered for service in the direction in which both of the elevator cars are traveling and one of the cars has a car call registered for such floor the corridor call may be assigned to the car having the registered car call.

In some cases the preassignment may be waived. When a fully-loaded car stops at a floor in response to a registered car call the departing passenger or passengers provide room for one or more intending passengers located at such floor. However, if the assigned car is heavily loaded preferably the remaining car is not by-passed as it approaches the assigned floor.

A further problem arises if the assigned elevator car is at a substantial distance from the assigned corridor call. In such a case the assigned car may permit the other car to accept the assigned call. In a preferred embodiment of the invention if the calls for service between the cars exceed the calls for floors ahead of the leading car, when the leading car approaches a floor having a call for service assigned to the trailing car the leading car is permitted to stop for such assigned call. However, in the absence of such a preponderance of calls between the cars the unassigned car by-passes the assigned call.

The assignment of corridor or floor calls may be effected for either up calls or down calls or all such calls. Inasmuch as the technique for each direction is similar it will suffice to discuss assignment for up corridor calls.

Figure 7:
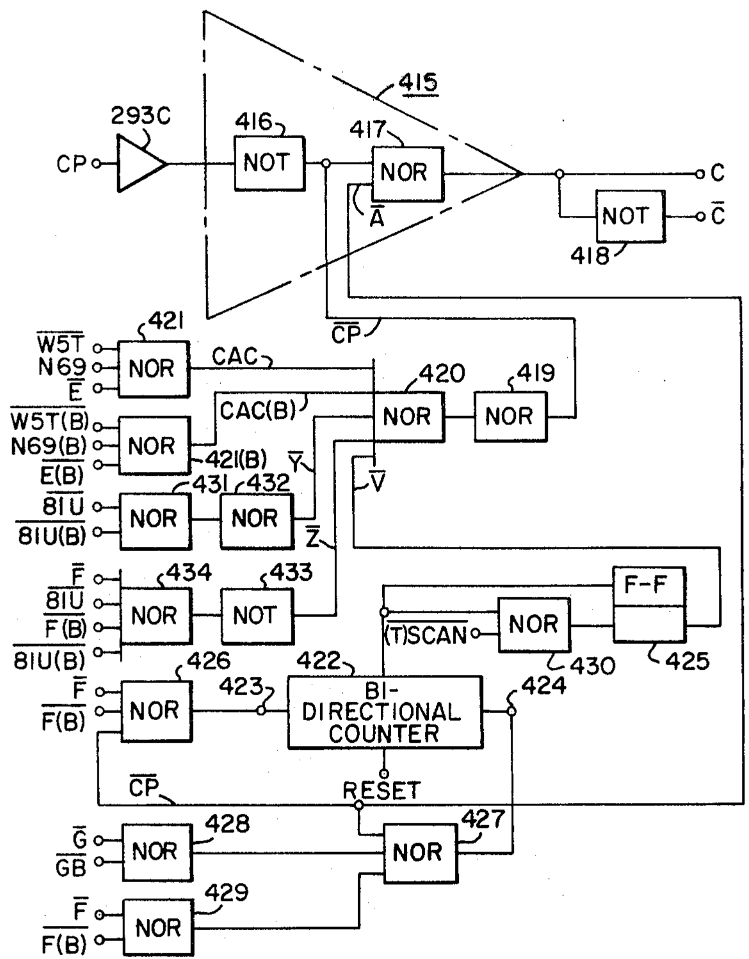

In the embodiment previously described the up-call signal C was derived directly from the output of the amplifier 293C, which has auxiliary up-call signals CP supplied to its input. When preassignment of the up calls is desired the up-call signal C is derived from the output of the amplifier 293C through a NOT element 416 and a NOR element 417 as shown in FIG. 7. The up-call signal $\overline{C}$ is derived from the signal C through a NOT element 418.

$\overline{A}$ is a call-gate signal which controls the derivation of the up-call signal C. The call-gate signal $\overline{A}$ provides a second input for the NOR element 417. When the signal $\overline{A}$ has a one value the system does not "see" an up-call signal.

The call-gate signal $\overline{A}$ is derived through a NOT element 419 from the output of a NOR element 420. The call gate signal $\overline{A}$ has a blocking value of one when a one value is presented by any one of the signals $\overline{V}$, CAC, CAC(B), $\overline{Z}$ and $\overline{Y}$.

CAC is an availability signal for the elevator car CA. It is derived from the output of a NOR element 421 having a first input supplied by the auxiliary-time signal $\overline{W5T}$. It will be recalled that the signal $\overline{W5T}$ is dependent on the presence of a load in the elevator car CA which is in excess of a predetermined value such as 80% of rated capacity.

N69 is a reverse signal which has a one value when the elevator car CA is to reverse when it reaches the furtherest floor in its direction of travel for which a call is registered requiring no further travel in such direction. Such reverse signals are well known in the art.

$\overline{E}$ is the car-call signal discussed above.

CAC(B) is the corresponding availability signal for the elevator car CB.

$\overline{V}$ is a call-comparison signal which is derived from the output terminal of a comparator element or bi-directional counter 422 having two input terminals 423 and 424. The input terminal 423 is supplied with a number of pulses proportional to the number of calls to be served by the elevator cars in their direction of travel and located ahead of the lead car. The terminal 424 is supplied with a number of pulses proportional to the number of calls between the elevator cars which would normally be answered by the trailing elevator car. If there are more calls ahead of the leading car than calls between the two elevator cars the leading car does not "see" the up call G. Under these conditions the signal $\overline{V}=1$.

The terminal 423 is energized from a NOR element 426 having a first input from the up-call signals $\overline{CP}$, a second input from the scan-above signal $\overline{F}$ for the car CA and a third input from the scan-above signal $\overline{F(B)}$ for the car CB. Thus the terminal 423 receives first pulses dependent on the number of up calls above both cars.

The terminal 424 is energized from a NOR element 427 which receives a first input from the up-call signals $\overline{CP}$, a second input from the NOR element 428 and a third input from the NOR element 429. The NOR element 428 receives two inputs from the scan-below signals $\overline{G}$ and $\overline{G(B)}$ and the NOR element 429 receives as inputs the two scan above signals $\overline{F}$ and $\overline{F(B)}$. Thus the terminal 424 receives second pulses dependent on the number of up calls between the cars.

The comparator 422 is reset by the signal RESET at the end of each scan cycle. If the first pulses exceed the second pulses it applies a one signal to the set terminal of a MEMORY element 425 which supplies the call-comparison signal $\overline{V}$ from its lower output.

If the first pulses do not exceed the second pulses, the comparator supplies a zero signal as a first input to a NOR element 430 which receives as a second input the scan signal $\overline{(T)SCAN}$ for the top floor. Under these conditions, when the scan reaches the top floor $$\overline{(T)SCAN}=0$$

the output of the NOR element 430 supplies a one signal to the reset terminal of the MEMORY element.

Therefore the call-comparison signal $\overline{V}=1$ unless during a scan cycle the first pulses to the terminal 423 fail to exceed the second pulses to the terminal 424.

$\overline{Y}$ is a both-up signal indicating when it has a zero value that both of the elevator cars are set for travel in the up direction. This signal is derived from the output of a NOR element 431 through a NOT element 432. The NOR element receives a first input from the up signal $\overline{81U}$ for the elevator car CA and a second input from the up signal $\overline{81U(B)}$ for the elevator car CB.

$\overline{Z}$ is a scan-ahead signal indicating when it has a zero value that the scan is ahead of both of the elevator cars. This signal is derived through a NOT element 433 from the output of the NOR element 434. The NOR element receives a first input from the scan-above signal $\overline{F}$ and a second input $\overline{81U}$, both for the elevator car CA, and a third input $\overline{F(B)}$ and a fourth input $\overline{81U(B)}$, both for the elevator car CB.

SPACING OF CARS

When two or more elevator cars are operated in a bank the cars have a tendency to bunch. Thus, when two elevator cars are running down, the leading car answers calls for down service which are ahead of both of the cars until the lagging car catches up with the leading car. Thereafter, the two cars run down the hatch substantially together. One of the objections to this bunching is that the two cars may stop for the same call for service.

The pulse system herein described is particularly suitable for eliminating the bunching of elevator cars. Continuous intelligence is derived which controls the spacing of the cars.

The extent to which the system may be adapted to distribute the cars depends in part on (1) Whether bi-directional scanning is used, (2) Whether both up and down calls ahead of the cars (i.e. ahead of both cars in a two-car system) are considered, and (3) Whether only cars serving calls in the same direction of travel are distributed.

Let it be assumed first that a two-car bank with a bidirectional scanning system has both cars running down. In order to distribute the cars equally with load, a bi-directional counter is arranged to count, in say a forward direction, the down calls below both of the cars during a down scan. On the up scan, the up calls would be counted by the counter in the forward direction. On a down scan the down calls from floors above both cars are counted by the counter in the forward direction. For floors between the cars down calls are counted by the counter in a backward direction. When this scan reaches the lower down-running car, if a count still remains in the counter the lead or lower car receives a by-pass signal, the counter is reset and the scanning sequence is repeated.

If the load is distributed equally the lead car does not receive a by-pass signal and thus may stop for down calls. However the counter may be biased, if desired, to maintain more calls ahead of both cars than between the cars.

Next, let it be assumed that a uni-directional scanning system is employed. Calls for service in the direction of car travel for floors above and below both cars are counted into the bi-directional counter in the forward direction and calls for service in the same direction from floors between the cars are counted into the counter in the backward direction. A cycle or sequence of scan in a system which scans only upwardly is completed when scanning at the floor of the higher car regardless of the direction of travel of the two cars. At this time one of the following conditions is present.

(1) If a count remains in the counter the lead car in the direction of travel receives a by-pass signal to prevent it from stopping for a corridor call. Thus if the cars are traveling down the lower car by-passes. The counter is reset and the scan continues.

(2) If no count remains in the counter, the cars are properly spaced and the lead car is not by-passed.

With this approach it is possible to weight the demand from one or more of the floors. Thus, one of the more important floors, usually the first floor, may have a demand which is weighted for the purpose of expediting the return of the leading car to the important floor.

In FIG. 8 the comparison of calls is effected by a comparator or bi-directional counter element 440 having an output terminal 440A, a reset terminal 440B, two forward input terminals 440C and 440D and a backward input terminal 440E.

When the scan is above both cars a signal is applied from the output of the NOR element 450 through a waveshaper element 450A to the terminal 440B for the purpose of resetting the bi-directional counter element 440. During the succeeding cycle if the number of pulses applied to the input terminals 440C and 440D exceeds the number of pulses applied to the terminal 440E an output is derived from the output terminal 440A which is employed in instructing the leading elevator car to by-pass corridor calls. Counter elements of this type are well known in the art. The inputs to the terminal 440E are derived through an OR element 441 from either of two NOR elements 442 and 443. The inputs to the terminal 440C are derived through an OR element 444 from either of two NOR elements 445 or 446.

Each of the NOR elements 442 and 445 receives a first input having a zero value when a floor being scanned has a registered down-floor call ($\overline{D}=0$). These NOR elements receive a second input V2 from a common NOT element 448A which has a zero value when both of the elevator cars are set for down travel. The input to the NOT element 448A is derived from a NOR element 448 having two inputs $\overline{81D}$ and $\overline{81D(B)}$.

The NOR elements 443 and 446 receive first inputs having a zero value when an up floor call is registered for the floor being scanned ($\overline{C}=0$). These NOR elements receive second inputs V1 having a zero value from a NOT element 447A when both of the elevator cars are set for up travel. The input to the NOT element 447A is derived from a NOR element 447 having two inputs $\overline{81U}$ and $\overline{81U(B)}$.

The NOR elements 442 and 443 receive third inputs Z1 through an OR element 449 from two NOR elements 450 and 451. These third inputs have a zero value when the scanning is of floors between the two cars ($\overline{F}=0$, $\overline{F(B)}=0$, $\overline{G}=0$, $\overline{G(B)}=0$).

The NOR elements 445 and 446 receive third inputs $\overline{Z1}$ from the OR element 449 through a NOT element 452. Consequently, these third inputs have a zero value when the scanning is below or above both of the cars.

The output of the bi-directional counter element 440 is supplied through a NOT element 453 to a NOR element 453A. Second and thjrd inputs to the NOR element are derived from the signals G, G(B). A fourth input is derived from the output of the NOR element 450.

If in any cycle the number of pulses supplied to the terminal 440C exceeds the number supplied to the terminal 440E the bi-directional counter supplies a one signal to the NOT element 453 which in turn supplies a zero signal to the NOR element 453A.

From the preceding discussion it will be understood that a weighted bias of one or more pulses may be applied to the terminal 440D for any desired floor. For present purposes it will be assumed that the terminal 440D is connected to the output of a NOR element 454 having as a first input the signal $\overline{(1)\text{SCAN}}$ and as a second input the signal $\overline{10(1)}$. Consequently if an up call is registered for the first floor $\overline{10(1)}=0$) at the time the first floor is being scanned $\overline{(1)\text{SCAN}}=0$) an input is supplied to the terminal 440D for the purpose of advancing the counter element forwardly.

The output of the NOR element 453A is supplied to the set terminal of a MEMORY element 453B. The reset terminal of this MEMORY element is energized from the output of a NOR element 453C which receives a first input from the counter terminal 440A, second and third inputs from the scan-below signals G and G(B), and a fourth input from the output of the NOR element 450. The MEMORY element 453B provides by-pass control signals $\overline{SP}$ and SP at its upper and lower output terminals.

Two auxiliary signals X1 and X2 for indicating the leading car from the upper and lower outputs of a MEMORY element 453D through NOT elements 453E and 453F respectively. The MEMORY element is set by the scan-below signal G for the car CA and reset by the scan-below signal G(B) for the other car.

The components of FIG. 8 which thus far have been specifically described are common to all of the elevator cars. The intelligence developed by these common components is supplied to separate components for each of the elevator cars for the purpose of further controlling the by-passing of the associated elevator car. The separate components for the elevator car CA now will be considered.

For the elevator car CA an auxiliary-by-pass signal 77A is derived from the lower output terminal of a MEMORY element 455. The set terminal of the MEMORY element 455 is connected to the output terminals of two NOR elements 456 and 457.

A first input, $\overline{SP}$, for each of the NOR elements 456 and 457 is derived from the output of the MEMORY element 453B. A second input for each of these NOR elements is derived from the car-position signal $\overline{B}$.

A third input V2 for the NOR element 456 is derived from the output of the NOT element 448A. A third input V1 for the NOR element 457 is derived from the output of the NOT element 447A.

A fourth input to the NOR element 456 has a zero when the car CA is the lower of the two cars and the scan is above the car CA.

To illustrate an operation supervised by the components of FIG. 8, if the elevator cars are traveling up (V1=0), if the car CA is above or leading the car CB position (X2=0), if the floor being scanned corresponds to the position of the car CA (so that $\overline{B}=0$), and if the leading car is to by-pass for the purpose of improving spacing ($\overline{SP}=0$), the output of the NOR element 457 sets the MEMORY element 455 to produce through the OR element 462 the by-pass signal 77. For down travel the NOR element 456 operates in a manner which will be understood from the operation of the NOR element 457 for up travel.

The two lower outputs of the MEMORY elements 132 (previously discussed) and 455 form two inputs for the OR element 462 which has for its output the by-pass signal 77.

Components for developing a by-pass signal 77(B) for the car CB are also shown. They will be understood from the discussion of those for the car CA. For the car CB the signals X1 and X2 are applied respectively to the NOR elements 457(B) and 456(B).

Preferably, the decision to stop is provided with a slight delay, such as a few milliseconds, sufficient to assure prior generation of a by-pass signal if a decision to by-pass is reached at the end of a scan.

I claim as my invention:

1. A vehicle system having a structure providing a plurality of landings, a vehicle, means mounting the vehicle for movement relative to the structure to serve the landings, and control means for moving the vehicle and stopping the vehicle at selected landings, characterized in that said control means comprises means for generating position signals representing the position of said vehicle, means for producing call signals representing calls requiring the stopping of the vehicle at selected landings in a predetermined direction, means for resetting occurring scanning pulses, scanning means controlled by said scanning pulses for scanning for said position signals and said call signals successively corresponding to said landings in a predetermined direction, means for resttting the scanning means upon completion of the scanning of the landings in the predetermined direction, and coincidence means responsive to a predetermined coincidence of said signals for stopping said vehicle at a selected one of said landings.

2. A system as claimed in claim 1 wherein said scanning means comprises means for scanning the landings successively in a first direction for determining said coincidence for travel of the vehicle in each direction.

3. A system as claimed in claim 1 in combination with time means for measuring a time interval, means responsive to detection of said vehicle by the scanning means for resetting the time means to start measurement of a new time interval, whereby failure of said scanning means to detect said vehicle results in timing out of said time means.

4. A system as claimed in claim 3 wherein said control means includes means responsive to timing out of the time means for conditioning the vehicle to stop successively at predetermined landings.

5. A system as claimed in claim 1 in combination with manually-operable means for operating said scanning means independently of said scanning pulses.

6. A system as claimed in claim 1 wherein said pulse means comprises means for generating a first set of pulses and a second set of pulses, said scanning means being successively advanced in scanning from landing to landing by pulses alternately derived from said first and second sets of pulses.

7. A system as claimed in claim 1 wherein said control means comprises means for altering in time one of said signals whereby said coincidence means responds to coincidence of one of the time-altered signals with one of the non-time-altered signals.

8. A vehicle system having a structure providing a plurality of landings, a vehicle, means mounting the vehicle for movement relative to the structure to serve the landings, and control means for moving the vehicle and stopping the vehicle at selected landings, characterized in that said control means comprises means for generating position signals representing the position of said vehicle, means for producing call signals representing calls requiring the stopping of the vehicle at selected landings, pulse means for generating repetitive regularly-occurring scanning pulses, scanning means controlled by said scanning pulses for scanning for said position signals and said call signals successively corresponding to said landings, and coincidence means responsive to a predetermined coincidence of said signals for stopping said vehicle at a selected one of said landings, wherein the control means comprises delay means for delaying the effective scanning position of one of said signals whereby said coincidence means responds to coincidence of the delayed one of the signals with one of the non-delayed signals.

9. A system as claimed in claim 8 wherein said delay means delays one of said position signals from a position corresponding to the actual landing to a position corresponding to another landing.

10. A system as claimed in claim 8 wherein said delay means delays the effective position in the scan at which a call signal is scanned from a position corresponding to the actual landing to a position corresponding to another landing.

11. A system as claimed in claim 1 wherein the control means comprises means effective during travel of the vehicle in a first direction for delaying the effective position in the scan at which one of the position signals is scanned, and means effective during travel of the vehicle in a second direction for delaying the effective position in the scan at which one of the call signals is scanned.

12. A system as claimed in claim 11 wherein each of said delays is an integral multiple of the time between successive ones of said scanning pulses.

13. A system as claimed in claim 1 comprising a second vehicle mounted for movement relative to the structure to serve the landings, said call-signal-producing means including vehicle call means for each of said vehicles operable from the vehicle for registering calls for landings at which the associated vehicle is to stop, and landing call means operable from each of the landings for registering calls for the landings at which one of the vehicles is to stop, said scanning means comprising first scanning means controlled by said scanning pulses for scanning for said position signals, landing call signals, and vehicle call signals for the first-named vehicle, means for producing position signals representing the position of the second vehicle, said scanning means including second scanning means controlled by scanning pulses for scanning for said last-named position signals, landing call signals and vehicle call signals for the second vehicle, said coincidence means comprising first coincidence means responsive to a predetermined coincidence of said signals scanned by the first scanning means for stopping the first-named vehicle at selected landings, and second coincidence means responsive to a predetermined coincidence of signals scanned by the second scanning means for stopping the second vehicle at selected landings, characterized in that preference means are provided for assigning a registered landing call to one of the vehicles having a registered vehicle call for the same landing.

14. A system as claimed in claim 13 wherein said preference means includes by-pass means responsive to the setting of the two vehicles for travel towards a landing for which a call is registered by the landing call means, the absence of a vehicle call for such approached landing for the leading vehicle, and the presence of a vehicle call for such approached landing for the trailing vehicle for by-passing the leading vehicle relative to such landing.

15. A system as claimed in claim 13 wherein said control means includes means responsive to a predetermined relation between calls ahead of and between the vehicles for modifying said assignment.

16. A system as claimed in claim 14 wherein said control means includes means responsive to a predetermined relation between registered calls for landing ahead of both vehicles and registered calls for landings between the vehicles for preventing said by-passing of the leading vehicle.

17. A system as claimed in claim 16 wherein said relation is that the registered calls for landings ahead of the leading vehicle is less than the number between the vehicles.

18. A system as claimed in claim 17 wherein each of said vehicles has a separate assembly including time means for measuring a time interval, means responsive to detection of the associated vehicle by the scanning means for such vehicle for resetting the associated time means to start measurement of a new time interval, whereby failure of a scanning means to detect a vehicle results in timing out of the associated time means, means responsive to timing out of the time means for conditioning the associated vehicle to stop successively at predetermined landings, manually-operable means for operating the associated scanning means independently of the scanning pulses, and delay means for delaying the effective position in the scan at which one of the asociated sets of signals if present is which one of the associated sets of signals if present is cessive ones of the scanning pulses, said coincidence means being responsive to the coincidence between said effective position of a delayed one of the signals and the remainder of the signals; the system further including means responsive to the distribution of registered calls for causing one of the vehicles to by-pass a registered landing call, a first electroresponsive device, a second electroresponsive device, a first source of first unidirectional pulses, a second source of second unidirectional pulses displaced from the pulses of said first source, a common transmission channel for said pulses, reference means providing first reference pulses and second reference pulses displaced from the first reference pulses, means responsive to the presence of said first unidirectional pulses and the first reference pulses for operating only the first of said electroresponsive devices from a first to a second condition, means responsive to the presence of the second unidirectional pulses and the second reference pulses for operating only the second of said electroresponsive devices from a first to a second condition, and means for limiting the response to the pulses of the associated one of the electroresponsive devices to a small fraction of each of the pulses, one of said electroresponsive devices when operated to its second condition remaining in such condition until a predetermined number of the series of pulses applied thereto fails to appear.

19. A system as claimed in claim 1 comprising a second vehicle mounted for movement relative to the structure to serve the landings, said call-signal-producing means including vehicle call means for each of said vehicles operable from the vehicle for registering calls for landings at which the associated vehicle is to stop, and landing call means operable from each of the landings for registering calls for the landings at which one of the vehicles is to stop, said scanning means comprising first scanning means controlled by said scanning pulses for scanning for said position signals, landing call signals, and vehicle call signals for the first-named vehicle, means for producing position signals representing the position of the second vehicle, said scanning means including second scanning means controlled by scanning pulses for scanning for said last-named position signals, landing call signals and vehicle call signals for the second vehicle, said coincidence means comprising first coincidence means responsive to a predetermined coincidence of said signals scanned by the first scanning means for stopping the first-named vehicle at selected landings, and second coincidence means responsive to a predetermined coincidence of signals scanned by the second scanning means for stopping the second vehicle at selected landings, characterized in that means are provided responsive to the distribution of registered calls for causing one of the vehicles to by-pass a registered landing call.

20. A control system having a first electroresponsive device, a second electroresponsive device, a first source of first unidirectional pulses, and a second source of second unidirectional pulses displaced from the pulses of said first source, characterized in the provision of a common transmission channel for said pulses, reference means providing first reference pulses and second reference pulses displaced from the first reference pulses, means responsive to the presence of said first unidirectional pulses and the first reference pulses for operating only the first of said electroresponsive devices from a first to a second condition, and means responsive to the presence of the second unidirectional pulses and the second reference pulses for operating only the second of said electroresponsive devices from a first to a second condition.

21. A control system as claimed in claim 20 in combination with means for limiting the response of each of the electroresponsive devices to the associated pulses to a small fraction of each of the pulses.

22. A system as claimed in claim 20 wherein one of said electroresponsive devices when operated to its second condition remains in such condition until a predetermined number of the series of pulses applied thereto fails to appear.

23. A control apparatus for a structure having a plurality of successive stations, a plurality of control devices, one for each of said stations, each of said devices having a plurality of input terminals including first and second input terminals and an output having first and second conditions dependent on a first condition of all of said inputs to the associated devices and the absence of said first condition of at least one of the inputs to such associated device respectively, one said control devices for a given station having its first input terminal energized in dependence on the output of the control device for a station next to the given station, said control devices having their second input terminals arranged in two groups each containing a plurality of second input terminals, and means for alternately energizing said groups.

24. In a selective energizing system having first and second electroresponsive devices, characterized in that there are provided a control device having a main current path and a control path responsive to its energization for controlling the conductivity of the main current path, a first source of unidirectional pulses, a second source of unidirectional pulses, the pulses from said two sources having the same repetition rate and being displaced in phase, first and second selection devices each operable from a first to a second condition, and means responsive to operation of the first selection device for energizing the control path to make the main current path conductive in phase with pulses from the first source, said last-named means being responsive to operation of the second selection device for energizing the control path to make the main current path conductive in phase with pulses from the second source, and means coupling the sources respectively to the electroresponsive device through the main current path.

25. A pulse comparison system having means for producing a first series of regularly spaced pulses, characterized in the provision of means for producing a second pulse representing a predetermined first condition of a variable quantity, means for producing a third pulse representing presence of a second condition, means for delaying the appearance of one of the first and second pulses by a time corresponding to a multple of the spacing between successive ones of said spaced pulses, and translating means responsive to coincidence of the delayed pulse, and the non-delayed one of said first and second pulses.

26. A system as claimed in claim 25 wherein the translating means is responsive to coincidence of the delayed pulse, the non-delayed one of said first and second pulse and one of said spaced pulses.

27. A vehicle system having a structure providing a plurality of landings, a first vehicle, a second vehicle, means mounting each of said vehicles for movement relative to the structure to serve the landings, and control means for moving each of the vehicles and stopping each of the vehicles at selected landings, means for registering calls requiring the stopping of the vehicles at selected landings, bypass means operable for causing each of the vehicles approaching a landing for which a call is registered which may be served by such vehicle to bypass such landing without stopping, characterized in that bypass control means are provided which are responsive to a predetermined relation between calls ahead of and between the vehicle for controlling the operation of the bypass means.

28. A system as claimed in claim 27 wherein said bypass control means comprises a bidirectional counter, means for operating the counter to count in one direction calls for service for landings ahead of both of the vehicles, means for operating the counter to count in a second direction calls for service for landings between the vehicles, and means responsive to the resultant count of the counter for controlling the operation by the bypass means.

29. A vehicle system having a structure providing a plurality of landings, a vehicle, means mounting the vehicle for movement relative to the structure to serve the landings, and control means for moving the vehicle and stopping the vehicle at selected landings, characterized in that said control means comprises means for generating position signals representing the position of said vehicle, means for producing call signals representing calls requiring the stopping of the vehicle at selected landings, pulse means for generating repetitive regularly-occurring scanning pulses, scanning means controlled by said scanning pulses for scanning for said position signals and said call signals successively correponding to said landings, time means for measuring a time interval, means responsive to detection of said vehicle by the scanning means for resetting the time means to start measurement of a new time interval, whereby failure of said scanning means to detect said vehicle results in timing out of said time means, and coincidence means responsive to a predetermined coincidence of said signals for stopping said vehicle at a selected one of said landings.

30. A system as claimed in claim 29 wherein said control means includes means responsive to timing out of the time means for conditioning the vehicle to stop successively at predetermined landings.

31. A vehicle system having a structure providing a plurality of landings, a vehicle, means mounting the vehicle for movement relative to the structure to serve the landings, and control means for moving the vehicle and stopping the vehicle at selected landings, characterized in that said control means comprises means for generating position signals representing the position of said vehicle, means for producing call signals representing calls requiring the stopping of the vehicle at selected landings, pulse means for generating repetitive regularly-occurring scanning pulses, scanning means controlled by said scanning pulses for scanning for said position signals and said call signals successively corresponding to said landings, and coincidence means responsive to a predetermined coincidence of said signals for stopping said vehicle at a selected one of said landings, and manually-operable means for operating said scanning means independently of said scanning pulses.

32. A vehicle system having a structure providing a plurality of landings, a vehicle, means mounting the vehicle for movement relative to the structure to serve the landings, and control means for moving the vehicle and stopping the vehicle at selected landings, characterized in that said control means comprises means for generating position signals representing the position of said vehicle, means for producing call signals representing calls requiring the stopping of the vehicle at selected landings, pulse means for generating repetitive regularly-occurring scanning pulses, scanning means controlled by said scanning pulses for scanning for said position signals and said call signals succesively corresponding to said landings, and coincidence means responsive to a predetermined coincidence of said signals for stopping said vehicle at a selected one of said landings, wherein said pulse means comprising means for generating a first set of pulses and a second set of pulses, said scanning mean being successively advanced in scanning from landing to landing by pulses alternately derived from said first and second sets of pulses.

References Cited

UNITED STATES PATENTS

| | | | |
|---|---|---|---|
| 2,827,981 | 3/1958 | Eames et al. | 187—29 |
| 2,941,624 | 6/1960 | Keppler et al. | 187—29 |
| 3,146,858 | 9/1964 | Leroux et al. | 187—29 |
| 3,169,606 | 2/1965 | Thirup | 187—29 |

ORIS L. RADER, Primary Examiner

W. E. DUNCANSON, Jr., Assistant Examiner

PO-1050
(5/69)

UNITED STATES PATENT OFFICE
CERTIFICATE OF CORRECTION

Patent No. 3,519,106 Dated July 7, 1970

Inventor(s) Andrew F. Kirsch

It is certified that error appears in the above-identified patent and that said Letters Patent are hereby corrected as shown below:

Column 4, line 46, before "CA" insert -- car --; line 63, cancel "engine" and substitute -- engage --.

Column 7, line 13, change "container" to -- contained --.

Column 9, line 14, after "56" change the period to a comma.

Column 10, line 38, change "NOR's" to -- NORS --.

Column 11, line 7, change "produce" to -- produced --; line 11, change "frm" to -- from --; line 15, change "floor" to -- floor --; line 68, change "genearting" to -- generating --; line 69, change "genearting" to -- generating --.

Column 14, line 33, change "can" to -- car --.

Column 15, line 18, change "an" to -- on --; at the end of line 18 insert a comma.

Column 18, line 42, change "erplace" to -- replace --.

Column 20, line 74, change "give" to -- gives --.

Column 21, line 33, change "or" to -- on --.

Column 28, line 31, before "direction" insert -- no --.

Column 29, line 68, change "a noutput" to -- an output --.

Column 31, line 21, after "reset" insert -- (STRB = 1). --; cancel line 23; line 25, change "represents" to -- represent --.

Column 32, line 2, change "contakes" to -- contacts --; line 61, change "map" to -- lamp --.

Column 33, line 2, change "in" to -- is --.

Column 34, line 31, cancel the period and substitute -- ( (T) SCAN = 0) --; cancel line 33.

Column 35, line 3, cancel "i nadvance" and substitute -- in advance --.

Column 38, line 1, change "call G" to -- calls C --.

Column 40, line 14, change "thjrd" to -- third --.

Column 41, line 34, after landings, cancel "in a predetermined direction, means for resetting" and substitute --,pulse means for generating repetitive regularly---; line 38, cancel "resttting" and substitute -- resetting --.

Column 43, line 23, cancel "asociated" and substitute -- associated --; cancel line 24; line 25, cancel "cessive" and substitute -- scanned for an integral multiple of time between successive --.

PO-1050
(5/69)

UNITED STATES PATENT OFFICE
CERTIFICATE OF CORRECTION

Patent No. 3,519,106 Dated July 7, 1970

Inventor(s) Andrew F. Kirsch Page 2

It is certified that error appears in the above-identified patent and that said Letters Patent are hereby corrected as shown below:

Column 44, line 68, cancel "multple" and substitute -- multiple --.

Column 45, line 39, cancel "correponding" and substitute -- corresponding --.

SIGNED AND SEALED NOV 17 1970

(SEAL)
Attest:

Edward M. Fletcher, Jr.
Attesting Officer

WILLIAM E. SCHUYLER, JR.
Commissioner of Patents